United States Patent [19]
Blount et al.

[11] Patent Number: 5,239,643
[45] Date of Patent: Aug. 24, 1993

[54] METHOD FOR REDUCING DISK I/O ACCESSES IN A MULTI-PROCESSOR CLUSTERED TYPE DATA PROCESSING SYSTEM

[75] Inventors: Marion L. Blount, Mahopac, N.Y.; Stephen P. Morgan; Katalin A. V. Rader, both of Austin, Tex.

[73] Assignee: International Business Machines Corporation, Armonk, N.Y.

[21] Appl. No.: 732,949

[22] Filed: Jul. 19, 1991

Related U.S. Application Data

[63] Continuation of Ser. No. 127,000, Nov. 30, 1987, abandoned.

[51] Int. Cl.$^5$ .................. G06F 13/14; G06F 12/08
[52] U.S. Cl. .................. 395/425; 395/800; 364/DIG. 1; 364/229; 364/238.1; 364/243; 364/243.1; 364/243.2; 364/243.5; 364/246; 364/254; 364/254.3; 364/256.3
[58] Field of Search .......... 364/DIG. 1, DIG. 2, 364/132, 133, 134; 395/425, 600, 650, 200, 800, 275; 371/10, 13

[56] References Cited

U.S. PATENT DOCUMENTS

| | | | |
|---|---|---|---|
| 3,647,348 | 3/1972 | Smith et al. | 395/425 |
| 4,078,254 | 3/1978 | Beausoleil et al. | 395/250 |
| 4,432,057 | 2/1984 | Daniell et al. | 395/725 |
| 4,445,174 | 4/1984 | Fletcher | 364/134 X |
| 4,577,274 | 3/1986 | Ho et al. | 395/425 |
| 4,635,189 | 1/1987 | Kendall | 395/600 |
| 4,730,249 | 3/1988 | O'Quin et al. | 395/700 |
| 4,742,447 | 5/1988 | Duvall et al. | 395/375 |
| 4,742,450 | 5/1988 | Duvall et al. | 395/700 |
| 4,851,988 | 7/1989 | Trottier et al. | 395/200 |
| 4,914,571 | 4/1990 | Baratz et al. | 395/600 |
| 5,109,515 | 4/1992 | Laggis et al. | 395/725 |

OTHER PUBLICATIONS

"An Introduction to Database Systems," vol. II, by C. J. Date, 1983, Chapter 7.

*Primary Examiner*—Paul V. Kulik
*Attorney, Agent, or Firm*—Robert M. Carwell; Marilyn D. Smith

[57] ABSTRACT

A method for minimizing I/O mechanical assess operations on secondary storage devices in a data processing system having a plurality of processor units interconnected in a cluster configuration to permit each processor unit to request and obtain data that is resident only on a secondary storage device of one processor unit. The method involves the steps of maintaining at each processor unit information about each copy of data that has been sent from the unit to another unit to permit a second request to the unit to be serviced by transferring a copy of the data from the main memory which is storing the data to the requesting unit rather than servicing the request with a relatively slow I/O accessing operation to a secondary storage device.

9 Claims, 12 Drawing Sheets

METHOD FOR REDUCING DISK I/O ACCESSES IN A MULTI-PROCESSOR CLUSTERED TYPE DATA PROCESSING SYSTEM

This is a continuation of application Ser. No. 07/127,000 field Nov. 30, 1987 now abandoned.

FIELD OF THE INVENTION

This invention relates in general to virtual memory data processing systems comprising a plurality of similar interconnected data processing units which share the same virtual memory addressing space and in particular to an improved method for reducing disk I/O access by each of the processing units.

RELATED APPLICATIONS

U.S. Application Ser. No. 06/819,458 filed Jan. 16, 1986, in the name of Duvall et. al, entitled "Method to Control I/O Accesses in a Multi-Tasking Virtual Memory Virtual Machine Type Data Processing System", now U.S. Pat. No. 4,742,477, is directed to a method for use in a multi-user page segmented virtual memory data processing system in which a mapped file data structure is selectively created to permit all I/O operations to the secondary storage devices to be executed by simple load and store instructions under the control of the page fault handler.

BACKGROUND ART

The prior art has disclosed a number of virtual memory data processing systems which employ a single stand alone Central Processing Unit (CPU). These systems generally employ a main memory having a plurality of individually addressable storage locations, each of which stores one byte of data and a secondary storage device such as a Disk File which includes a plurality of block addressable storage locations each of which stores a block of data. For discussions purposes it is convenient to assume that each block address of the disk file stores a page of data comprising for example 2K (2048) bytes of data. The virtual memory concept involves what is sometimes referred to as a single-level store. In a single-level store, the maximum address range of the system is generally much larger than the real capacity of the main memory. The main memory is made to appear much larger by the use of a paging mechanism and a secondary storage device which cooperate to keep the data required by the application program in main memory.

The function of the paging mechanism is to transfer a page of data from the disk file to main memory whenever a page which is addressed by the application program is not in main memory. This is called a page fault. Transferring the page of data from the disk file to main memory is called page fault handling.

The performance of a virtual memory data processing system is directly related to the number of disk accesses that occur in servicing page faults since accessing a disk is a relatively slow process typically requiring several milliseconds, whereas accessing main memory typically involves less than a single microsecond. Prior art virtual memory systems therefore employ various techniques to reduce disk accesses and increase the percentage of "hits" that are made in addressing virtual memory. A hit is made in addressing virtual memory if data addressed by an application program is in main memory at the time the application program addressed the data. The hit ratio r of a virtual memory system is the number of hits h in addressing virtual memory divided by the number of hits h plus misses m, or $$r = h/(h+m)$$

The prior art has also disclosed a number of multi-processor system configurations that are sometimes employed to obtain increased data processing power. A multi-processor system configuration may be thought of as a plurality of Processing units sharing a logical communication channel. The logical communication channel may take the form of memory shared among the processing units into which messages from one processing unit to another processing unit may be placed. Additionally, the logical communication channel may take the form of a communication network through which messages from one processing unit to another processing unit may travel.

In some prior art multi-processor system configurations referred to as tightly-coupled multi-processor configurations, the processing units in the configuration share some amount of memory which any of the processing units in the configuration may access, and each processing unit may have some amount of private memory which only it and no other processing unit may access.

Computing systems arranged in a tightly-coupled multi-processor configuration have the benefit of rapid communication via shared memory and may also exploit the shared memory as a disk cache. A page fault may occur when an application program executing on one of the processing units in a tightly-coupled multi-processor configuration addresses a page of data that is not in main memory. During page fault handling, the appropriate secondary storage device connected to the configuration is commanded to place the appropriate page of data into the shared memory. Once the page of data has been placed in the shared memory it may be addressed by any of the processing units in the configuration.

If the plurality of processing units in a multi-processor configuration are working on a common problem, it is normal for the data they access to be accessed in such a way as to experience "locality of reference". The term locality of reference is used when there is some non-zero probability that a page of data retrieved from secondary storage and placed in shared memory to satisfy a page fault resulting from an access to virtual memory by an application program executing on one processing unit in the configuration will also be accessed by another application program executing on another processing unit in the configuration before the page frame in shared memory holding that page of data has been re-used by the configuration to hold another page of data. If such an access by another application program executing on another processing unit in the configuration occurs, the configuration may avoid a disk access by satisfying the page fault with that page of data already in shared memory.

A practical limit however is reached for tightly-coupled multi-processor configurations when the contention for access to shared memory among the processing units in the configuration exceeds the benefit provided by the shared memory when used as a disk cache. For instance, one processing unit in the configuration may attempt to change the contents of a page of data while another processing unit is attempting to examine the contents of the same page of data. Some mechanism must normally be provided by the configuration to lock out one of the processing units in favor of the other so that the two processing units see a consistent view of the data. Various methods exist in the prior art to enforce a consistent view of data upon the processing units in a tightly-coupled multi-processor configuration. These methods involve idling one of the processing units in the configuration until the other processing unit has completed its access to shared memory. The processing unit that has been idled cannot be idle and also perform useful work; thus, contention for access to shared memory inevitably results in some loss of processing power for the configuration when considered as a whole. For these reasons, the number of processing units in a single tightly coupled multi-processor configuration rarely exceeds six.

In some other prior art multi-processor system configurations referred to as closely-coupled multi-processor configurations, the plurality of processing units is connected via a communications network and each processing unit may access its own memory directly and no other processing unit has access to that memory. The processing units in a closely-coupled multi-processor configuration may share data by sending messages via the communications network to other processing units within the configuration. A variation on the closely-coupled multi-processor configuration distinguishes one of the processing units in the configuration as a shared memory processing unit. The main memory attached to the shared memory processing unit is used as a disk cache managed by the shared memory processing unit. The shared memory processing unit is assigned the function of controlling which of the other processing units can have access to what area of the shared memory at what time and under what configurations. When the shared memory is a virtual memory involving a fast main memory and a relatively slow secondary storage device, the size of the main memory which is required to obtain a respectable hit ratio is directly related to the total number of instructions that are being executed by the multi-processor configuration per second. Individual processing units are sometimes rated in Millions of Instructions Per Seconds (MIPS). If two 4 MIPS processing units and a third shared memory processing unit are employed in a closely-coupled multi-processor configuration, the main memory associated with the configuration must have approximately 80 megabytes of byte addressable memory to obtain a respectable hit ratio. The rule of thumb that is used is that 10 megabytes of byte addressable main memory per MIPS is required to obtain an 85 percent hit ratio in the shared memory. Therefore, if another 4 MIPS processing unit is added to the multi-processor configuration, another 40 megabytes of byte addressable memory should be added to the main memory of the shared memory processing unit to maintain the 85 percent hit ratio. A practical limit however is reached in the number of processing units that can be added to the configuration before the cost parameters and performance reach the point of diminishing returns.

More recently the prior art has begun to configure stand alone personal computers or stand alone engineering work stations into a local area network. In such an arrangement, which is called a loosely-coupled multi-processor configuration or a distributed system configuration or a cluster configuration, any work station can communicate with another work station employing standard communication protocols. The motivation that exists for establishing the cluster configuration is not necessarily more data processing power, but simply one of the convenience of exchanging information electronically vs. non-electronic exchange. However, it has been found in some situations that the individual work stations are running the same operating system and at times run the same application programs. A paper entitled "Memory Coherence in Shared Virtual Storage Systems" authored by Kai Li and Paul Hudak and presented at the 5th Annual Association for Computing Machinery Symposium on Principles of Distributed Computing 1986, discloses a plurality of virtual memory data processing units interconnected in a cluster configuration. In this arrangement all units have the same operating system and address the same virtual address space. Each unit is the owner of a different set of files which is stored in that owner's memory system. A non-owner running an application program obtains access to the other unit's memory system through a suitable communication link, which causes requests to the file owner for virtual pages of data which are then returned to the requester.

Each unit of the cluster configuration therefore shares the set of files in its virtual memory system with the other units in the configuration. Page faults resulting from requests are serviced by the file owner. If the request is local, that is from the owner, the requested page is transferred from the owner's secondary storage directly to the owner's main memory. If the request is from a remote unit, the page is transferred from the owner's secondary storage to the requester's main memory through the communication link. A system protocol is established to control what happens to pages of data after the requesting unit is finished with them. This protocol addresses such issues as, when to return a page to the owner, how to manage concurrent requests for the same page if one unit wants to write to that page while other units want to read from that page, and various other situations that are common to functions that share stored data.

The sharing by each processing unit of its virtual memory with other processing units in the cluster has some potential advantages in that the size or capacity of the secondary storage devices can be reduced since the total umber of files available to the cluster is spread out among a number of secondary storage devices. This would permit the use of devices with faster access times and/or lower cost. A potential disadvantage is that concurrent requests from a number of different units to an owning unit will each result in a number of disk accesses to occur in sequence. While the requests are generally serviced in an overlapped manner, a disk access is a relatively time consuming operation for the unit and could severely impact the performance of the owning unit which is perhaps executing an unrelated application program, that is competing for the services of the secondary storage device.

The present invention is directed to a novel method for use by a shared virtual memory, cluster configured, data processing system in which the number of page faults requiring access to the secondary storage devices is considerably reduced.

SUMMARY OF INVENTION

The new method for reducing disk I/0 access operations in a shared virtual memory type data processing system comprising a plurality of virtual memory type data processing units interconnected in a cluster configuration, is based on the realization that when a request to the access coordinator or owner of a page of data results in a page fault, considerable time can be saved in servicing that page fault, if a copy of the page is in the main memory of one of the other units in the cluster. For example, assume that Page P is from a file owned by Unit A and that a request by a non-owner such as Unit B is made for Page P to Unit A who is the access coordinator in the system for the segment containing that page. Assume also that the request to A required Unit A to get Page P from its secondary storage device by use of its page fault handling mechanism. Assume further that a copy of Page P was sent to the Unit B and is in the main memory of Unit B when another request is made to Unit A for Page P from Unit C. If Unit A can ask Unit B to send the copy of Page P to Unit C, a page fault handling operation involving an I/O operation to the secondary storage device of Unit A is avoided.

In accordance with the new method, the individual processor units within a cluster of multi-processors, individually coordinate access to multiple segments of the common virtual memory address space. Each segment of virtual memory is logically composed of 128K (131,072) pages, each of which is composed of 2K (2048) bytes of memory. The processor units within the cluster share these virtual memory segments among other processor units within the cluster. A single processor unit serves as the access coordinator of a given file of data assigned to a specified virtual memory segment. Other processor units that use the virtual memory segment are individually called "using processor units". The strategy of the method to implement consistent access to cached pages of virtual memory basically comprises four important aspects.

1. The ownership of a page changes dynamically with its use; thus the right to update a page may be assigned by the access coordinator for the segment containing the page to a given using processor unit and remains with that processor unit until contention for the page requires it to be revoked by the access coordinator for the segment containing that page and assigned to another processor unit.

2. Ownership of one portion of a page implies ownership of the entire page. If, for example, a processor unit accesses the first byte on a page and that unit is granted the capability of accessing that byte, it is also granted the capability of accessing the entire page.

3. The coordination of access to a page is assigned statically and is the processor unit coordinating the segment containing the page.

4. The access coordinator for a given page records in the Virtual Shared Memory Table (VSMT) which processor units have a copy of the page, the access rights individual processor units hold (e.g., read only vs. read/write) and a list of other processor units that are seeking access to the page. The method involves recording at a segment's access coordinator, which pages of the segment are resident in the memory of which using processor unit. The using processor unit requesting access to a page avoids disk I/O by reading the page from a processor unit that has it in its memory system, rather than reading it from disk. In this way, the private memories attached to the individual processor units within the cluster are virtually shared among each other.

The number of entries in the VSMT table are determined at cluster IPL time or at execution time, based on performance measurements and requirements. The number of VSMT entries is always bounded by the number of page frames of real storage in the cluster. For example, if a cluster consists of 16 processor units each of which has 16 megabytes of memory directly attached to it, there is a total of $2^{**}17$ frames in the cluster. If an entry for each frame were allocated to the VSMT in each processor unit, then 11 megabytes of storage would have to be allocated in each processor unit for the VSMT table. For practical purposes, the VSMT table never needs to be that large. The VSMT table does not need to represent pages in the real memory of the access coordinator since these pages are already represented in its page table. Only those pages of those segments, both code and data that are actually shared across the cluster and are in real memory at any given time, need to be represented in the VSMT table. Thus, only a fraction of physical memory frames will contain pages of shared segments at any given time, other frames containing non-shared pages need not be represented in the VSMT table.

The strategy to determine the number of entries in the VSMT table is to create it initially with a small number of entries and to let the number of entries grow with use.

The method further employs "Triangular I/O" which is a scheme for performing I/O among two or more processors. In the unit processor view of the world, I/O is performed between a master unit, the processor and a "slave unit" (a control unit). The master sends requests to the slave, which processes them and responds to them. For example, a processor might send a request for a virtual page to some control unit for a set of disks. The control unit would handle the request by locating the appropriate blocks of data on its disks and transferring them back to the requesting processor. In a cluster, the concept of master and slave units is less clear. For example, a processor unit R might send a request to some other processor unit Q for a page P stored on a disk device connected directly to processor unit Q. Processor unit Q might handle the request in the same way the control unit would or it might try to avoid a disk I/O by forwarding the request to another processor unit T that has a copy of the requested page in physical memory attached to it. Processor unit T might send the requested page to processor unit R rather than having to send it through processor unit Q. In this sense processor units R, Q and T were involved in a "Triangular I/O" with page P. Interprocess communication was reduced and a second I/O operation to a disk device was avoided.

It is therefore an object of the present invention to provide an improved method for reducing the number of access operations to secondary memory devices in a virtual memory type data processing system.

Another object of the present invention is to provide an improved method for use in a data processing system having a plurality of interconnected virtual memory type processing units in which I/O access operations to resolve page faults are minimized.

A still further object of the present invention is to provide in a multi-processor cluster environment, an improved method for resolving page faults which occurs when a requested page is not in the main memory of the requesting processor unit.

DESCRIPTION OF THE PREFERRED EMBODIMENT

Figure 1:
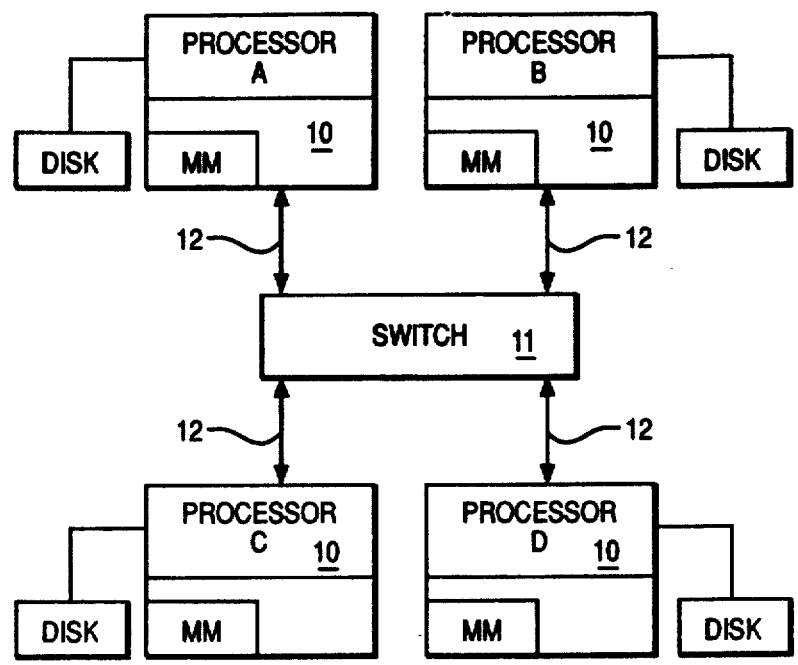
FIG. 1 is a Functional Block Diagram of a plurality of processor units interconnected in a cluster configuration, in which the method of the present invention may be advantageously employed.

FIG. 1 is a block diagram of a multi-processor cluster configured data processing system in which the method of the present invention may be advantageously employed. As shown in FIG. 1, the data processing system comprises a plurality of processor units 10, a switch 11 and a plurality of communication links 12, each of which connects one processor unit 10 to switch 11. The function of switch 11 is to permit any processor unit 10 to communicate with any other processor unit. The specific details of the witch and the communication links are not considered relevant to an understanding of the present invention and hence are neither shown or described in detail. Examples of the switching arrangement that may be employed may be found in U.S. Pat. Nos. 4,635,250; 4,633,394; 4,630,015; 4,605,928.

Figure 2:
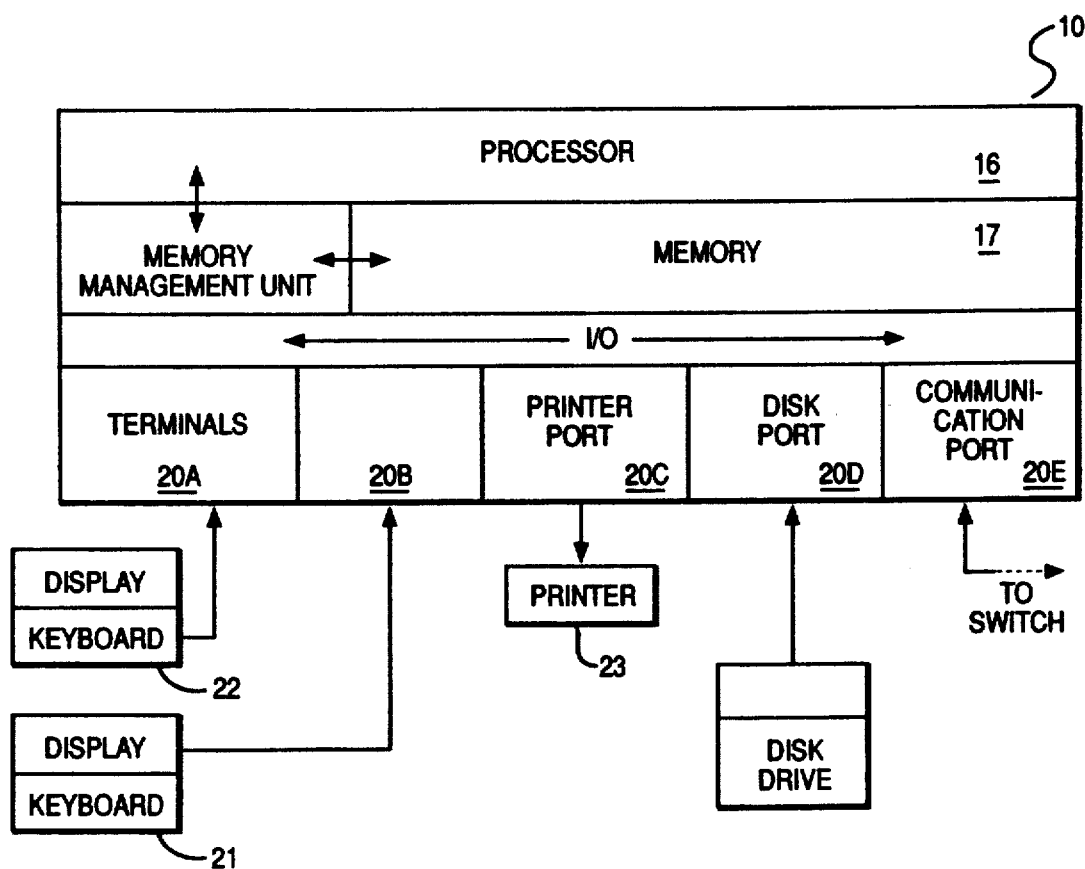
FIG. 2 is a Block diagram of one of the processor units shown in FIG. 1, illustrating the various functions that are incorporated in one of the units.
Figure 3:
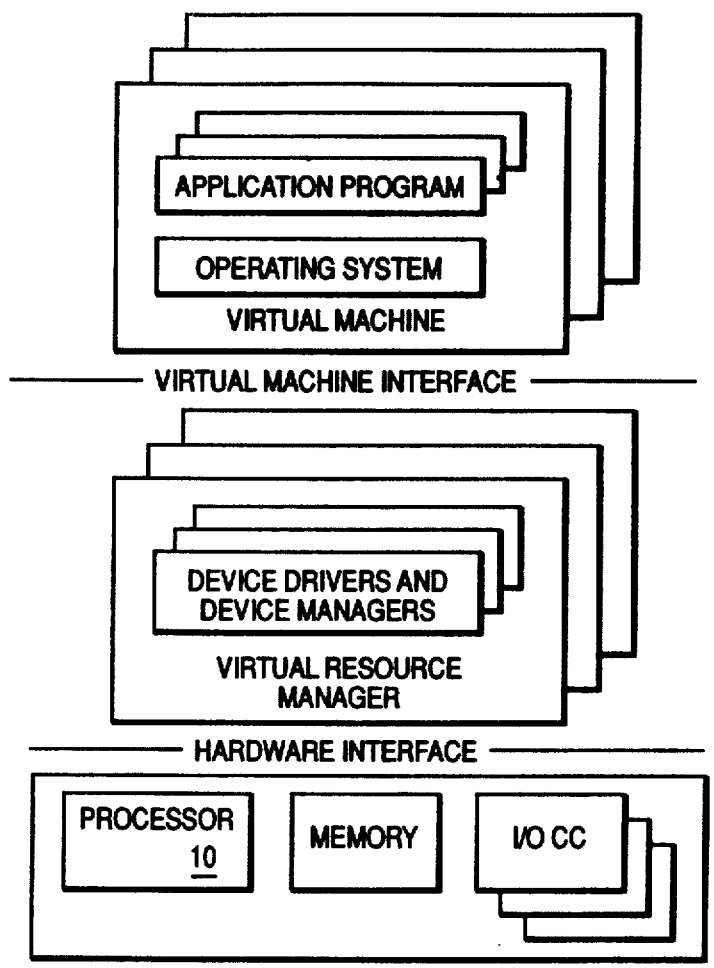
FIG. 3 is a Block diagram of one of the processing units shown in FIG. 1 illustrating the various software functions that are incorporated in the unit of FIGS. 2 and 3.
Figure 4:
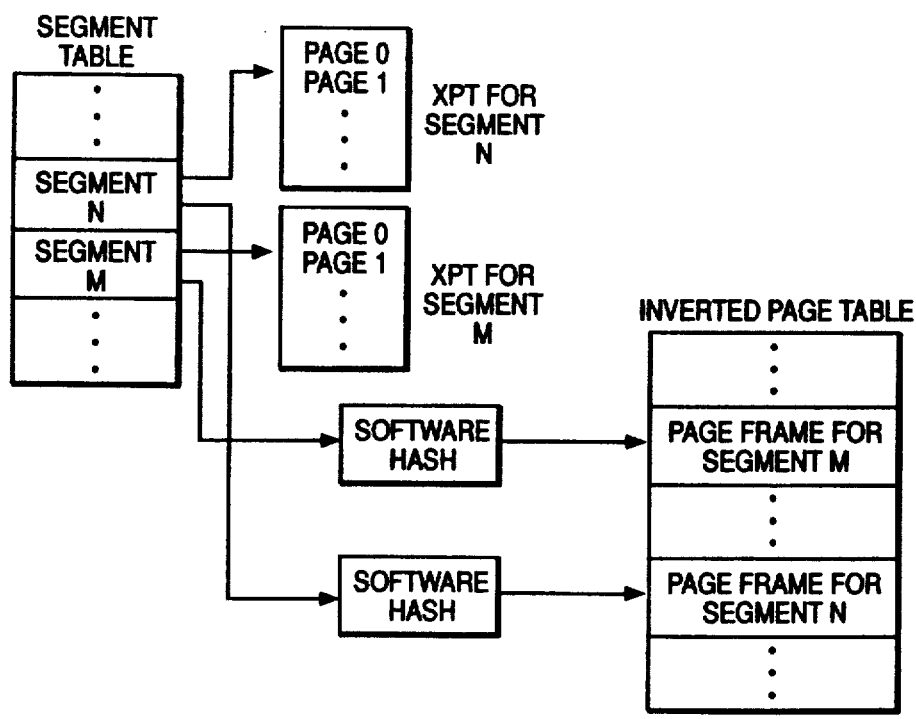
FIG. 4 illustrates an External Page Table (XPT) data structure employed by the Virtual Memory Manager function of the unit shown in FIGS. 2 and 3.

FIG. 2 illustrates in detail one of the processor units 10 shown in FIG. 1. Processor unit 10 may be a high function personal computer or an engineering work station such as the IBM RT PC# running an operating system based on the UNIX operating system such as the IBM AIX# operating system. The processor unit 10, as shown in FIG. 2, comprises a microprocessor 16, a main memory 17, a memory management unit 18 which controls the transfer of data between the processor 16 and memory 17, and a plurality of I/O adapters or ports 20A-20E. Ports 20A and 20B function to connect display type terminals 21 and 22 to the system. Port 20C connects a printer to the system while port 20D connects disk drive 24 to the system. The communication port 20E is employed to connect the processor unit 10 to the communication link 12.

For purposes of discussion, processor unit 10 corresponds generally to the virtual memory data processing system that is described in detail in cross referenced application Ser. No. 819,458. As described in that application, the processor has a 32 bit effective address that is converted into a 40 bit virtual address by employing the 4 high order bits 31-28 to select one of 16 segment registers, each of which stores a 12 bit segment address that defines one of 4096 unique segments. Each segment comprises 256 megabytes of storage ($2^{**}28$). If a page includes 2K bytes of data, then a segment contains 128K pages. On the other hand, if a page includes 4K bytes of data, the segment then has 64K pages, or more precisely, 64K virtual addresses which may be used to identify pages of data that are currently assigned to that segment.

As explained in the cross reference to application, an operating system based on he UNIX operating system is employed for the processor unit so that application programs and data employed by these programs are organized in accordance with the UNIX file system type of organization. Existing files are stored on the secondary storage devices of the processor unit which may be assumed to be a disk file. The unit of storage or addressability of the disk file is a disk block, which for purposes of discussion, will be assumed to store one page of data. Read and write system calls function to control the transfer of data between main memory and disk storage.

In a virtual memory organization, the memory manager and a page fault handling mechanism also function to control the transfer of pages between the disk file and main memory in response to load and store type of instructions being executed by the application program.

In the system disclosed in the cross referenced application, the operating system is provided with a Map Page Range Service (MPRS) which functions to map a file into an assigned segment of the *Trademark of ATT; #Trademark of IBM virtual address space. The MPRS employs an External Page Table (XPT) data structure in which the disk block address containing a page of a file is assigned a virtual address in the assigned segment.

The memory manager also employs an Inverted Page Table (IPT) data structure for correlating real addresses in main memory where a page of data is stored to a virtual address assigned to that page. The system disclosed in the cross referenced application also employed a way to convert read and write system calls in the operating system to load and store instructions having virtual address which reflected the system call parameters and the Unix offset pointer in the file. All disk I/O operations were therefore under control of the memory manager and page fault handling mechanism in the system of the cross referenced application.

The operation of the processor unit 10 in executing an instruction for an application program is briefly as follows. The virtual address of the instruction is hashed with a suitable hashing algorithm to provide an index into a Hash Anchor Table (HAT). The indexed entry in the HAT contains a pointer to the first entry in a list of virtual addresses that hash to the same value. If a page having a virtual address that would hash to the value that provides the pointer to the list is in real memory, then the virtual address is in the list. The page frame in real memory where the page of data is stored is obtained from the entry in the list containing the virtual address. If the virtual address is not on the list, the corresponding page is not in real memory and a page fault has occurred.

The page fault handling mechanism is then activated. By referencing the XPT entry created when the file was mapped, the page fault handling mechanism locates the disk block address where the page having the requested virtual address is stored. Since the XPT is not pinned in memory, the page fault handling mechanism may encounter a page fault when it first references the XPT. However, once the appropriate page of XPT entries is paged into memory, the original page fault can be serviced. The page is transferred to a page frame in memory that has been made available and the application process is restarted.

It should be understood that the virtual memory manager operation summarized above is just one of the many prior art virtual memory management functions that can be used in the processor unit shown in FIG. 1 and on which the method of the present invention relies.

As indicated in FIG. 1, the units are interconnected by switch 10 and communication links 12 to permit one unit to be selectively interconnected in a data transferring relationship with one other unit. As stated earlier, communication port 20E is the normal interface to communication link 12 that is connected to the switch 11. A remote memory manager function is added to each unit 10 and provides an interface between port 20E and the native memory manager function 18. The function of the remote memory manager of processor unit 10A for example, is to process a request for a virtual page P of data from the remote memory manager function of processor unit 10B. The request is sent to processor unit 10A because 10A has been assigned as the access coordinator for that page and file. To process the request for page P, the remote memory manager function first determines if the requested page is in the main memory of the unit 10A. If the page P is there, a copy Pb is returned to unit 10B and a data structure referred to as the Virtual Shared Memory Table (VSMT) and shown in FIG. 7, records the fact that unit 10B has a copy of the requested page in its main memory. The remote request was initiated by unit 10B when an instruction having a virtual address was executed by unit 10B and recognized as involving a file that was stored at unit A. The manner in which the Access Coordinator of a file or a virtual page is recognized is discussed in detail later on the specification.

The above operation is a simple direct request and transfer operation involving two processor units. A slightly more involved operation occurs if it is assumed that the requested page Pa is paged out of the main memory of unit A so that the only copy in any main memory is the copy Pb that was previously sent to unit B. Assume now that unit C requests a copy of the same page from unit A. Unit A does have a copy of the requested page P on disk, but this would require a relatively long disk I/O operation to retrieve it and forward it to unit C. The remote memory manager of unit A in servicing the request from unit C would first check unit 10A's inverted page table and determine that it was not in the main memory of unit 10A. At this point, prior art systems would take the page fault and retrieve the page from disk. The new method, however, merely checks the SVMT data structure for the virtual address of the requested page Pb and is advised that a copy Pb is still in the main memory of unit 10B. The remote memory manager of unit 10A therefore sends a message to the remote memory manager of unit 10B, requesting that unit 10B send a copy of the page Pb to the remote memory manger of unit 10C. The initial request by unit 10C is said to have been serviced by a "triangular I/O operation." While a triangular I/O operation involves a number of messages including the transfer of a page of data, the time involved is at least 2 orders of magnitude faster with present day storage and communication technologies than would be involved in retrieving the requested page from unit 10A's disk file.

It should be noted that in the cluster shown in FIG. 1, each unit is running the same operating system and that preferably only one copy of each file exists in the cluster. Each file is assigned a processor unit which acts as the Access Coordinator for that file. The file is stored on the processor unit's secondary storage device. The file/access coordinator assignment can be established by the name given to the file similar to the convention employed by the PC-DOS operating system which uses drive and path parameters in the full name of the file. Alternately, a simple access coordinator table could be employed listing each file in the cluster along with the current access coordinator.

It should be assumed that in the following discussion, a page of data comprises $2^{}11$ or 2K bytes (2048), that a segment consists of $2^{}17$ or 1284K pages (131,072). Since the virtual address space employed by the cluster is used by each processor unit, two new data structures and identifiers are employed. The Local Segment Identifier (LSID) shown in FIG. 6 uniquely identifies a segment with its access coordinator. The LSID comprises 12 bits.

Figure 6:
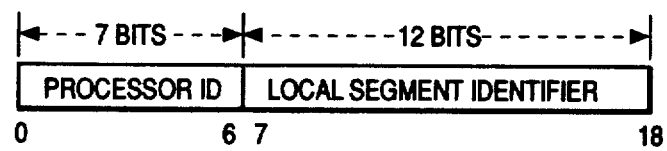
FIG. 6 illustrates the Global and Local Segment Identifier data structures which uniquely identify virtual memory segments.

The Global Segment Identifier (GSID) shown in FIG. 6 comprises 19 bits which uniquely identify the processor unit within the segment. The GSID comprises an 7 bit processor ID portion and the 12 bit LSID.

Figure 7:
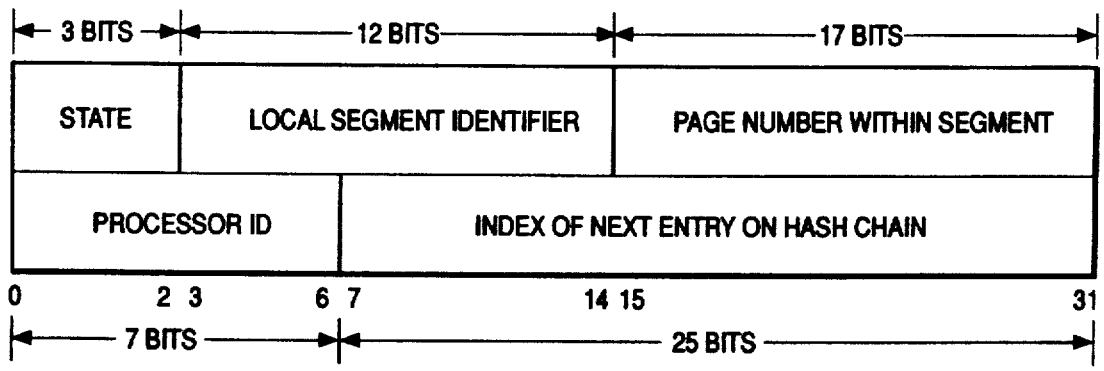
FIG. 7 illustrates the Virtual Shared Memory Table (VSMT) data structure employed by the method of the present invention.

The VSMT data structure is shown in FIG. 7 and is similar in many respects and functions to an inverted page table used by each processor unit.

Each entry of the VSMT includes the following fields:

| State Indicator | 4 bits |
| --- | --- |
| Local Segment ID | 24 bits |
| Page Number Within Local Segment | 16 bits |
| Last Entry Indicator | 1 bit |
| Processor ID | 8 bits |
| Index of Next Entry on Hash Chain | 31 bits |

Figure 5:
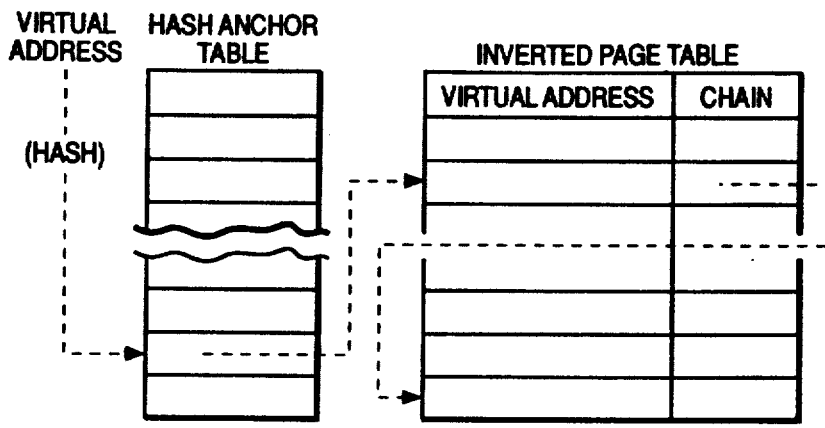
FIG. 5 illustrates an Inverted Page Table data structure employed by the Virtual Memory Manager function of the unit shown in FIGS. 2 and 3.

As discussed earlier, the inverted page table employed by each processor unit 10 functions to correlate page frame addresses in main memory with the virtual address of the page that is stored in the page frame. An inverted page table as shown in FIG. 5 has one entry for each page frame in its main memory. The data contained in each of the inverted page tables in the cluster is not per se duplicated in the VSMT that is stored by that processor unit. The function of the VSMT for a processor unit is to log entries that reflect that a virtual page which is being coordinated by that processor unit has been sent to another unit in the cluster. Stated differently, the VSMT for a processor unit is updated when a virtual page that the processor unit is coordinating is transferred to another processor unit of the cluster.

Figure 8:
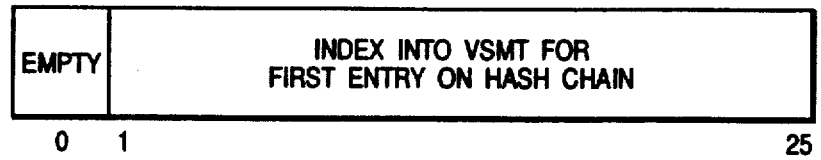
FIG. 8 illustrates the VSMT hash anchor table.

The VSMT for a processor unit 10 is a list of entries as shown in FIG. 7. Entry into the table is by an index stored in the system hash anchor table shown in FIG. 8. The index is to the first entry in the section of the table whose virtual addresses hash to the same value. These sections are referred to as hash value sections. Entries in each hash value section are sequenced in ascending order of Local Segment ID's. Within the same LSID, entries are sequenced increasingly by virtual page index.

The hash value for a virtual address is obtained for example by hashing the LSID cf the segment containing the page with the page's Virtual Page Index. The hash value is an index into the anchor table to provide a pointer to the head of the hash entries in the VSMT.

Figure 9:
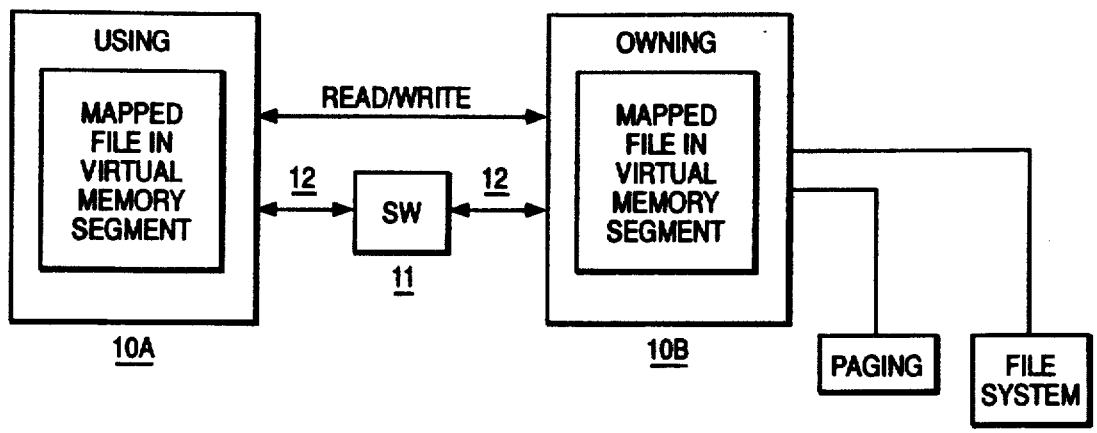
FIG. 9 shows a model of a shared map file and the segments associated with it.

A shared mapped file consists of at least two virtual memory segments. At each using processing unit on which at least one application program has the file open there is one segment per open system call issued by an application program, and at the owning processing unit there is one segment. FIG. 9 shows a model of a shared mapped file. The segment at using processing unit 10a is bound to the segment at owning processing unit 10b using the Bind Remote Segment Service (BRSS). All of the pages of processing unit 10a's segment are mapped read-write to the owning processing unit segment using the Map Remote Page Range Service (MRPRS).

To map a file, an application program first issues the open system call to open the file. The application program then issues the shmat system call to map the file into the application program's virtual address space. The shmat system call uses the Map Page Range Service (MPRS) to load the file into virtual memory. The application program can now directly access the file with load and/or store instructions. No other interaction with the operating system is required to access the file. When the application program is finished with the file, it can remove the file from its virtual address space by issuing the shmat system call. Alternatively, the program could just issue the close system call since the close system call will automatically perform the shmat system call as required.

Sharing of the data in a given mapped file is performed in a cluster environment by binding the using processing unit's segment associated with the open file to the owning processing unit's segment associated with the open file. Each using processing unit that has a file mapped into a virtual memory segment has one segment for mapped file that application programs executing on it have opened. All application programs at a given using processing unit or the owning processing unit logically share the same segment. The owning processing unit's segment associated with the open file is the segment to which each using processing unit's segment associated with the open file is linked.

One of the requirements for sharing virtual memory segments across a cluster configuration is to ensure that updates to mapped files behave the same in both a stand alone configuration and a cluster configuration. This implies that each store instruction executed against a mapped file must appear to be immediately applied to all copies of the mapped file shared throughout the cluster. This may be achieved by enforcing a set of consistency rules on access to mapped files.

These consistency rules are:

(1) At most one processing unit within the cluster configuration may have a copy of a given page of the segment if one or more application programs executing on that processing unit is (are) writing into the page.

(2) Any number of processing units within the cluster configuration may have a copy of a given page of the segment if no application programs executing on any processing units in the cluster are writing into the page.

The virtual memory managers (VMMs) at the owning processing unit and the using processing units cooperate to enforce these consistency rules. Each VMM enforces these consistency rules by using a prior art hardware page protection mechanism. Each page in shared virtual memory has two page protection keys associated with it. The former key is the requested protection key specified using the Create Segment Service (CSS) or the Protect Page Service (PPS). This key is used to determine what type of memory access is valid for the page. The latter key is the effective protection key. This key is used to enforce the data consistency rules for shared mapped files.

Each page in a mapped file has one of three distinct consistency states at any given time. These consistency states apply to both using processing unit and owning processing unit shared mapped files. The consistency states for a given page of a mapped file that is shared across a cluster are recorded in the Virtual Shared Memory Table (VSMT) State Field (see FIG. 7). A description of how the VSMT data structure is updated is described below. The consistency states are as follows:

NoAccess: A copy of the page is not in the main memory of the processing unit. Any access to the page by an application program will result in a page fault occurred interrupt to be signaled to the VMM. This state places no additional restrictions on the valid consistency states of a copy of the page at any other processing unit in the cluster.

ReadOnly: A copy of the page is in the main memory of the processing unit and the copy of the page has not been modified since having been placed in main memory. The effective protection key for the page is read-only. A store access to the page will result in a page fault occurred interrupt to be signalled to the VMM if the requested protection key is read-write. A store access to the page will result in a protection exception occurred interrupt to be signalled to the VMM if the requested protection key is read-only. The former interrupt is used to inform the VMM that an application program attempted to access the page for writing. The latter interrupt is used to inform the VMM that an application program attempted to access the page for writing although it did not have permission to do so. This is generally considered an error condition, and appropriate error handling must be executed to handle the error in an appropriate way.

Other processing units within the cluster may access the same page for reading when the page is in the ReadOnly consistency state. No other processing units within the cluster may access the same page for writing when the page is in the ReadOnly consistency state. ReadWrite: A copy of the page is in the main memory of the processing unit and the page has been modified since it was placed in the main memory of the processing unit. The effective protection key for the page is read-write. An access to the page for either reading or writing will be allowed without causing a page fault occurred interrupt to be signalled to the VMM. An access to the page for reading may cause a protection exception interrupt to be signalled to the VMM if the requested protection key does not allow read access to the page. An access to the page for writing may cause a protection exception interrupt to be signalled to the VMM if the requested protection key does not allow write access to the page. No other processing unit within the cluster may access the same page for either reading or writing when the page is in the ReadWrite consistency state.

The consistency state of a page may be effected by the occurrence of one of several different events. These events are: (1) accesses to the page by application programs executing on the same processing unit; (2) execution of the Purge Page Range (PPRS) at the same processing unit; (3) execution of the Purge Segment Service (PSS) at the same processing unit; (4) execution of the VMM page replacement mechanism at the same processing unit; and (5) changes to the consistency state of the page at another processing unit within the cluster. The VMMs executing at each of the processing units within a Z5 cluster cooperate to ensure that an occurrence of any of these events results in a valid transition of the page consistency state. The valid transitions allowed by the VMMs are:

NoAccess to ReadOnly: This consistency state transition is triggered by a page fault occurred interrupt having been signalled to the using processing unit VMM resulting from a read access to the page. Upon receipt of the page fault occurred interrupt, the using processing unit VMM sends a message to the owning processing unit VMM requesting that the owning processing unit VMM send the data for the page along with permission to access the page for reading to the using processing unit VMM.

In some instances it may be desirable for the VMM at the using processing unit to "remember" the previous consistency state for the page and treat this transition as if it were a write access to the page occurring when the consistency state of the page was ReadWrite instead of a read access to the page occurring when the consistency state of the page was NoAccess. This variation in protocol would prevent two consistency state changes when a write access to the page follows a read access to the page which in practice is often the case. If this variant protocol is adopted, upon receipt of the page fault occurred interrupt, the using processing unit VMM sends a message to the owning processing unit VMM requesting that the owning processing unit VMM send the data for the page along with permission to access the page for writing to the using processing unit VMM.

NoAccess to ReadWrite: This consistency state transition is triggered by a page fault occurred interrupt being signalled to the using processing unit VMM resulting from a write access to the page. Upon receipt of the page fault occurred interrupt, the using processing unit VMM sends a message to the owning processing unit VMM requesting that the owning processing unit VMM send the data for the page along with permission to access the page for writing to the using processing unit VMM.

ReadOnly to ReadWrite: This consistency state transition is triggered by a page fault occurred interrupt being signalled to the using processing unit VMM resulting from a write access to the page. Upon receipt of the page fault occurred interrupt, the using processing unit VMM sends a message to the owning processing unit VMM requesting that the owning processing unit VMM send permission to access the page for writing to the using processing unit VMM.

ReadOnly to NoAccess: This consistency state transition is triggered when a page frame containing an unmodified page is reassigned by the using processing unit VMM to hold another page of data or when an unmodified page is purged using either the Purge Segment Service (PSS) or the Purge Page Range Service (PPRS), or when the owning processing unit VMM requested that the using processing unit VMM change the effective protection key for the page to NoAccess, which would occur if an application program executing at another using processing unit that has the file mapped for read-write attempts to access the page for writing.

ReadWrite to NoAccess: This consistency state transition is triggered when a page frame containing a modified page is selected for replacement by the using processing unit VMM or when a modified page is purged using either the Purge Segment Service (PSS) or the Purge Page Range Service (PPRS), or when the owning processing unit VMM requested that the using processing unit VMM change the effective protection key for the page to NoAccess, which would occur if an application program executing at another using processing unit that has the file mapped for read-write attempts to access the page for writing. The using processing unit VMM sends the data contained in the page to the owning processing unit VMM along with notification that the using processing unit VMM has changed the consistency state for the page to NoAccess, and has purged the page from its main memory.

ReadWrite to ReadOnly: This consistency state transition is triggered when a page frame containing a modified page is selected for replacement by the using processing unit VMM or when a modified page is purged using either the Purge Segment Service (PSS) or the Purge Page Range Service (PPRS), or when the owning processing unit VMM requested that the using processing unit VMM change the effective protection key for the page to NoAccess, which would occur if an application program executing at another using processing unit that has the file mapped for read-write attempts to access the page for writing. The using processing unit VMM sends the data contained in the page to the owning processing unit VMM along with notification that the using processing unit VMM has changed the consistency state for the page to ReadOnly, and has set the effective protection key to allow read-only access to the page.

The owning processing unit VMM ensures that a valid combination of consistency states exists at each of the nodes accessing the mapped file. This is achieved by having the owning processing unit VMM maintain a list of writers to each page that is managed under the owning processing unit's consistency control algorithm and by having the owning processing unit send requests to using processing units to change the consistency state of a given page of data. Any request by any using processing unit to access the page for reading will cause the owning processing unit to send a request to a using processing unit that has an application program executing on it that has written to the page to change the consistency state for the page from ReadWrite to ReadOnly. Any request by any using processing unit to access the page for writing will cause the owning processing unit to send a request to a using processing unit that has an application program executing on it that has the page in the ReadWrite consistency state to change the consistency state for the page to NoAccess, or to send a request to each using processing unit that has the page in the ReadOnly consistency state to change the consistency state for the page to NoAccess.

The protocol for updating the various SVMT of each processor unit to reflect the processing of the pages that it is coordinating, by other processors units will depend to a large extent on the particular application. In some applications it may be more efficient to notify the Access Coordinator when:..the copy is no longer in main memory of the requestor so that the coordinator will not service another request by a triangular I/O operation involving that unit.

Likewise, the protocol for protecting pages being written by more than one processor unit could take the form of many of the prior art protection schemes involving locking bits. The techniques discussed by A. Chang and M. Mergen in an article entitled "801 Storage: Architecture and Programming",presented in the Proceeding of the the 1987 Conference of the ACM Special Interest Group on Operating Systems on Nov. 26, 1987 may be employed.

Figure 10:
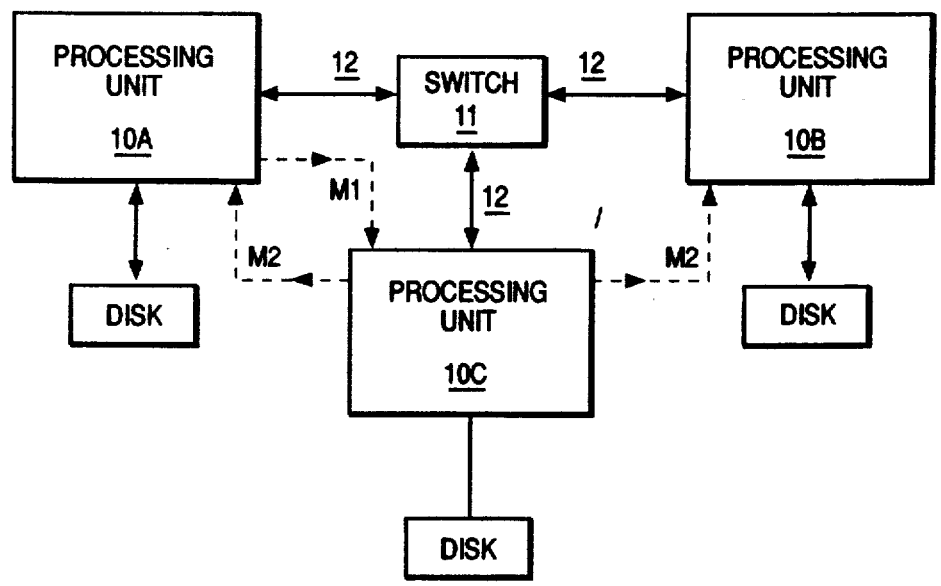
FIG. 10 is a block diagram of a basic cluster configuration which is one environment employed to describe some typical operations that are performed by the method of the present invention.

Typical operations will now be described in connection with FIGS. 10. FIG. 10 is a block diagram of a cluster configuration consisting of three processing units 10a, 10b, and 10c, a switch 11, and three communication links 12 that connect the processing units to the switch. Each of the processing units has a secondary storage device which may be thought of as a disk attached directly to it. Except for the contents of the files stored on the secondary storage devices attached to an individual processing unit, processing units 10a, 10b, and 10c should be thought of as identical. We shall use FIGS. 10-13 to illustrate typical operations in the cluster configuration. The description of these operations and the flow of messages is at a level of detail such that a person skilled in the art of implementing a software virtual memory manager component of a general purpose operating system will be able, without undue experimentation, to implement the method.

Figure 11:
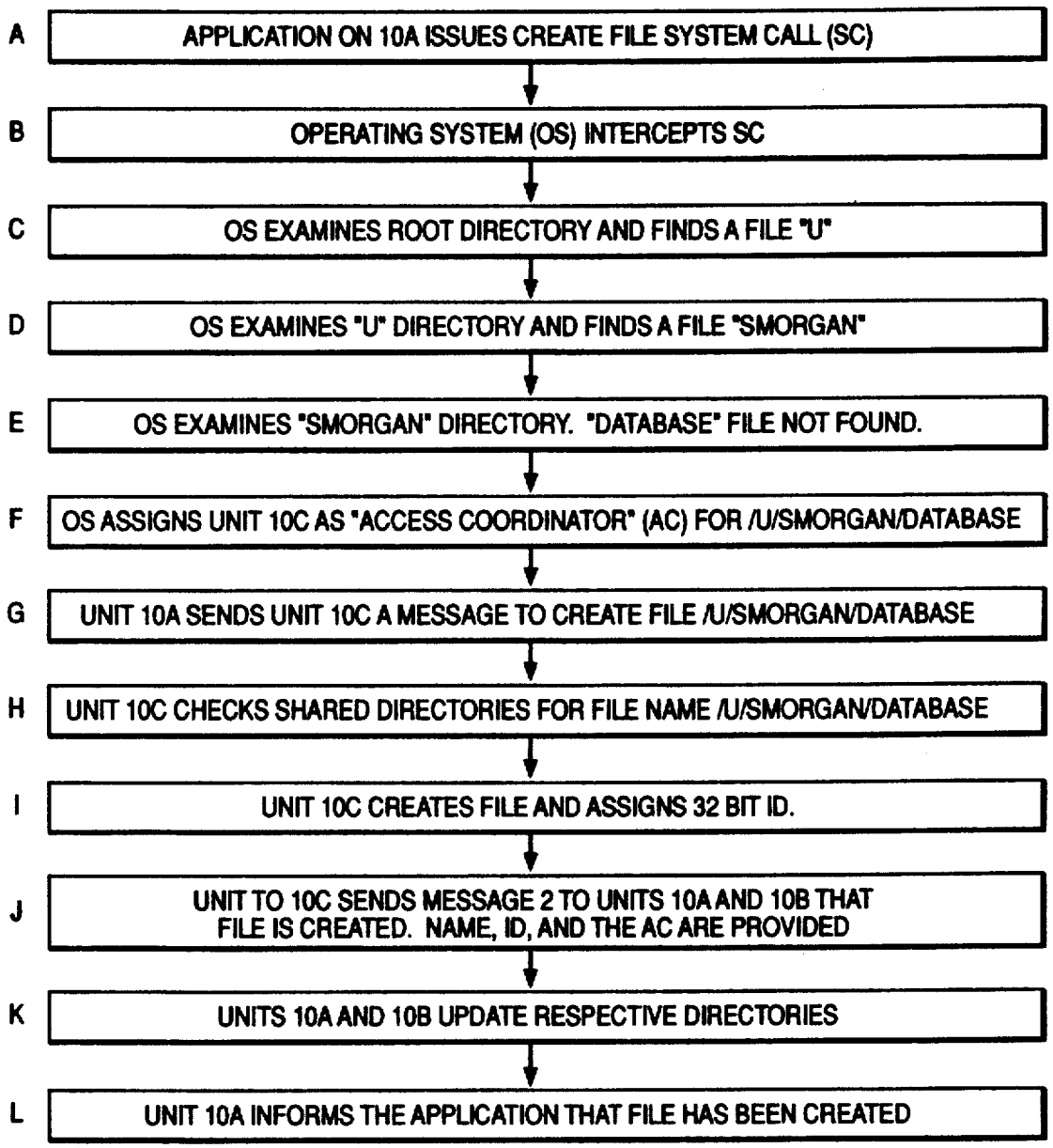
FIG. 11 is a flow chart illustrating the steps for creating a new file that is stored on one of the processing units in the cluster.

FIG. 11 is a flow chart illustrating the steps for creating a new file that is stored on one of the processing units in the cluster.

In Step A of FIG. 11, an application program executing on processing unit 10a uses the create [sic] system call to create the file "/u/smorgan/database se".

In Step B the operating system executing on processing unit 10a intercepts the system call from the application program.

In Step C the operating system examines the "root" system directory. The system directories individually contain lists of file names each with the name of the access coordinator for that file. We shall assume for the purpose of discussion that a file naming convention and directory structure of the UNIX operating system is used, although persons skilled in the art will understand that this assumption is not necessary for the purpose of implementing the method. For example, the application program may have asked to create the file "/u/smorgan/database". The operating system examines the root system directory, called "/", and finds that it contains an entry for "u" and that u is a directory.

In Step D the operating system examines the u directory and determines that it contains an entry for "smorgan" and that smorgan is a directory.

In Step E the operating system examines the smorgan directory and finds that it does not contain an entry for "database". Steps C-E are called the directory lookup phase of the create system call.

In Step F the operating system determines which processing unit in the cluster is a good candidate to serve as the access coordinator for the file once it is created. The operating system uses some algorithm, whose exact working is unnecessary for an understanding of the method, to make a judicious choice. For example, the choice of an access coordinator might be based on a computation of which of the processing units is least heavily loaded with access coordinator duties for other existing files. By picking the least heavily loaded processing unit, the operating system might be making an assumption that the configuration will provide the best overall performance if the access coordination function is spread uniformly among the various processing units in the configuration.

After having chosen one processing unit in the configuration as the access coordinator for the to-be-created file /u/smorgan/database, which for the purpose of discussion is assumed to be processing unit 10c.

In Step G processing unit 10a sends message 1 to processing unit 10c to create the file.

In Step H, upon receipt of message 1 from processing unit 10a, processing unit 10c determines that the file does not yet exist within the configuration by examining the various shared directories in a way similar to that performed by processing unit 10a in the directory lookup phase (Steps C-E) of the create system call.

In Step I processing unit 10c creates the file and assigns it a file identifier FID. For the purpose of this discussion we shall assume that a file identifier is a 32 bit integer that uniquely identifies the file in the configuration. The file identifier may have been composed by concatenating the processing unit identifier for the access coordinator (processing unit 10c) with a number chosen by the access coordinator that uniquely identifies the file to the access coordinator. A processor identifier is a 7 bit integer that uniquely identifies a given processing unit within a cluster configuration.

In Step J processing unit 10c sends message 2 to each of the other processing units 10a and 10b in the configuration that the file identified by FID has been created. Message 2 includes the name of the file, its file identifier FID, and the processor identifier PID of the access coordinator.

In Step H, upon receipt of message 2 from processing unit 10c, each of the other processing units 10a and 10b updates its copy of the system directories to indicate the existence of the newly created file /u/smorgan/data base along with the file identifier FID and the access coordinator processor identifier PID for the file.

In Step K, upon receipt of message Z from processing unit 10c, processing unit 10a determines that the file /u/smorgan/database has been created, and In step L 10A processing unit 10A informs the application program executing on processing unit 10a that this is the case.

Figure 12A:
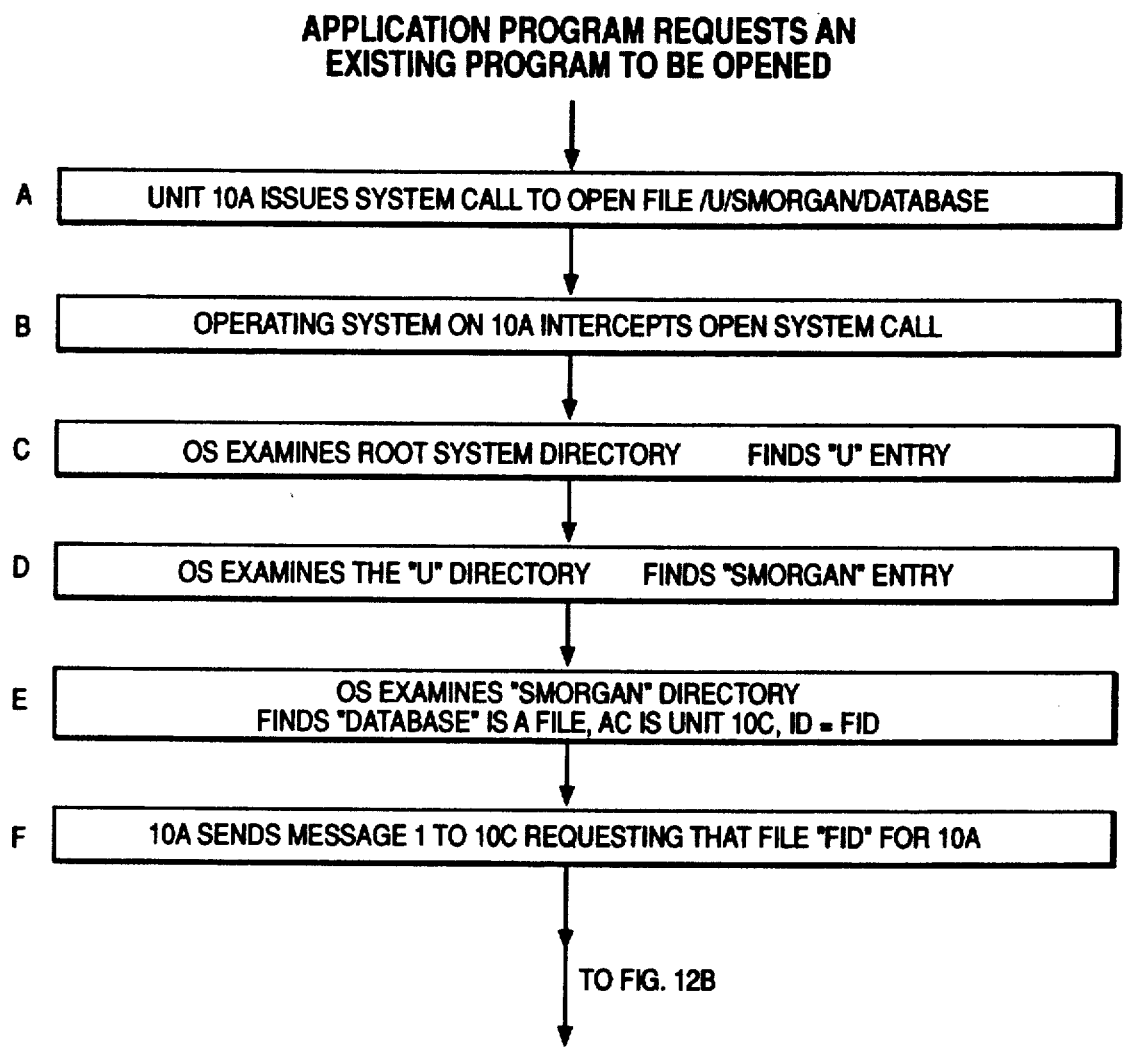
FIGS. 12a and 12b is a flow chart illustrating how an existing file is opened by an application program running on a processing unit within the cluster.
Figure 12B:
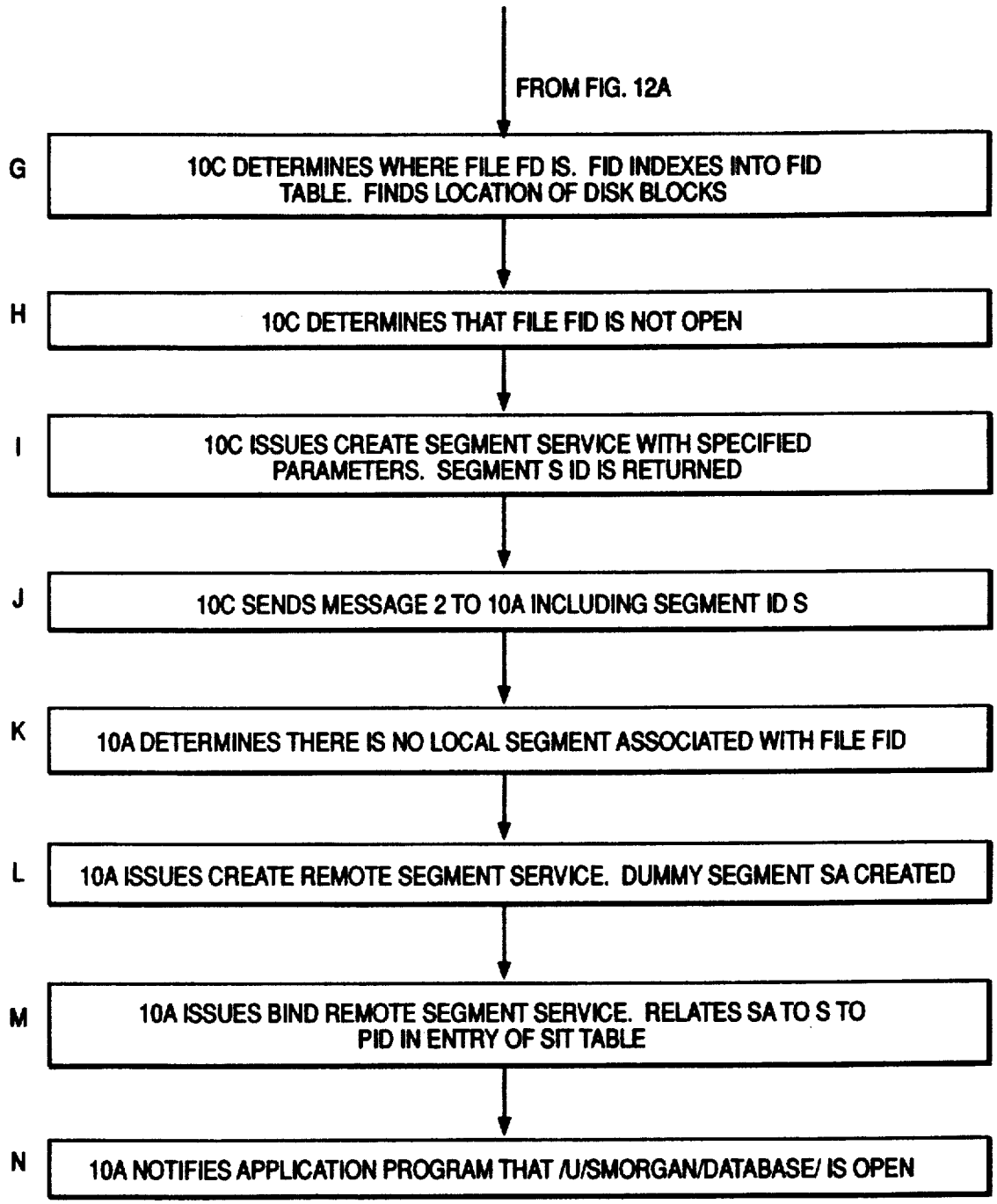

FIGS. 12A and 12B is a flow chart illustrating how an existing file is opened by an application program running on a processing unit within the cluster.

In Step A of FIG. 12, an application program executing on processing unit 10a uses the open system call to open the file "/u/smorgan/database" for read-write access.

In Step B the operating system executing on processing unit 10a intercepts the system call from the application program.

In Step C the operating system examines the root system directory "/" and finds that it contains an entry for "u" and that u is a directory.

In Step D the operating system examines the u directory for "smorgan" and determines that smorgan is a directory.

In Step E the operating system examines the smorgan directory for "database" and determines: (1) that database is a file; (2) that the access coordinator for the file is processing unit 10c; and (3) that the file identifier FID is associated with the file.

In Step F the operating system executing at processing unit 10a sends message 1 containing file identifier FID to processing unit 10c, requesting that the file identified by FID be opened on behalf of an application program executing on processing unit 10a.

In Step G, upon receipt of message 1 from processing unit 10a, processing unit 10c determines the location on its secondary storage device of file descriptor FD, which describes the file identified by FID. The processing unit 10c locates file descriptor FD by using file identifier FID to index into the File Descriptor Table (FDT) located at processing unit 10c. The FDT located at processing unit 10c contains a file descriptor for each existing file for which processing unit 10c serves as access coordinator. A file descriptor identifies the number and location of disk blocks on secondary storage devices attached to processing unit 10c that are part of a given file. In addition, a file descriptor contains other information about a file, such as its length, the time it was most recently accessed, the name of the its owner, etc. Persons skilled in the art will understand that the additional information contained in a file descriptor is irrelevant insofar as developing an understanding of the method is concerned; thus, it is not discussed.

In Step H processing unit 10c determines that the file identified by FID is not currently open, i.e. it does not currently have a local virtual segment associated with it.

In Step I processing unit 10c uses the Create Segment Service (CSS) to create a virtual memory segment for the file FID. In doing so, processing unit 10c specifies that the segment is to be created using file descriptor FD, and also that the requested protection key for the segment to be created is to be read-write. CSS returns a segment identifier S by which the segment it created may be identified.

In Step J processing unit 10c sends message 2 to processing unit 10a responding that processing unit 10c has successfully opened the file identified by FID on behalf of processing unit 10a. Message 2 identifies the segment identifier S as the segment associated with the file identified by FID.

In Step K processing unit 10a determines that the file identified by FID is not currently open, i.e. it does not currently have a local virtual segment associated with it.

In Step L processing unit 10a creates a local segment SA for the file identified by FID using the Create Remote Segment Service (CRSS). CRSS takes the segment identifier S and creates a "dummy" segment SA. A dummy segment is a local segment with a segment identifier and a Segment Identifier Table (SIT) entry, but without an External Page Table (XPT).

In Step M processing unit 10a uses the Bind Remote Segment Service (BRSS) to bind the local segment SA to the global segment S. BRSS takes the segment identifiers S and SA, the processor identifier PID of the access coordinator (processing unit 10c), and modifies the SIT entry associated with segment SA to indicate that segment SA relates to segment S whose access is coordinated by processing unit PID.

In Step N processing unit 10a determines that file u/smorgan/database has been successfully opened and informs the application program that this is the case.

Figure 13:
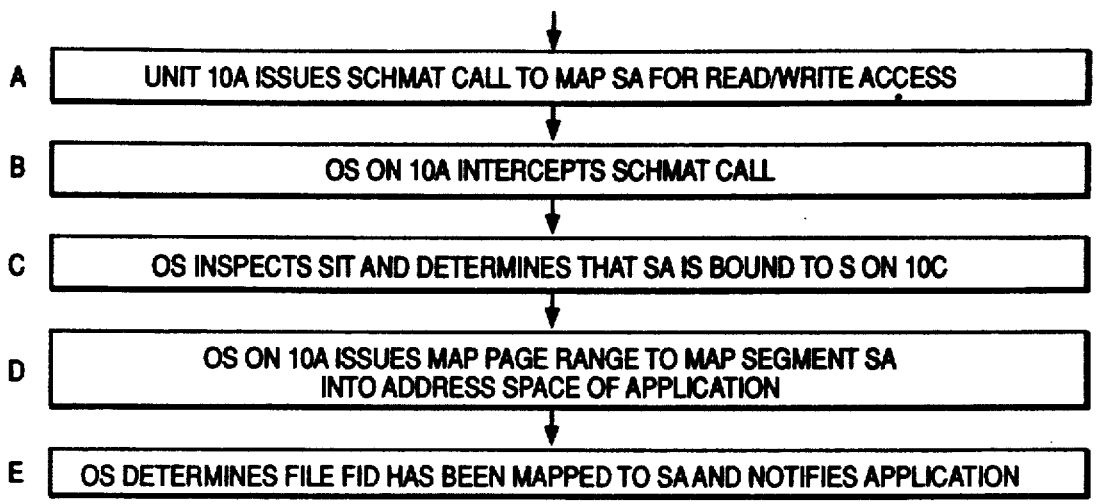
FIG. 13 is a flow chart illustrating how an existing file is loaded int o the virtual memory shared in a cluster configuration.

FIG. 13 is a flow chart illustrating how an open file is loaded into the virtual memory shared in a cluster configuration.

In Step A of FIG. 13, an application program executing on processing unit 10a uses the shmat system call to map the local segment SA associated with the open file "/u/smorgan/database" into the application program's virtual address space for read-write access.

In Step B the operating system executing on processing unit 10a intercepts the system call from the application program.

In Step C the operating system determines that the local segment SA is bound to a remote segment S whose access is coordinated by processing unit 10c. Processing unit 10a makes this determination by examining the Segment Identifier Table (SIT) relating a given segment identifier for a currently open file to the appropriate remote segment for the currently open file and the processor identifier of the access coordinator associated with that segment.

In Step D processing unit 10a uses the Map Page Range Service (MPRS) to map the contents of segment SA into the virtual address space of the application program.

In Step E processing unit 10a determines that the file /u/smorgan/data base has been successfully mapped into the virtual address space of the application program and informs the application program that this is the case.

Figure 14:
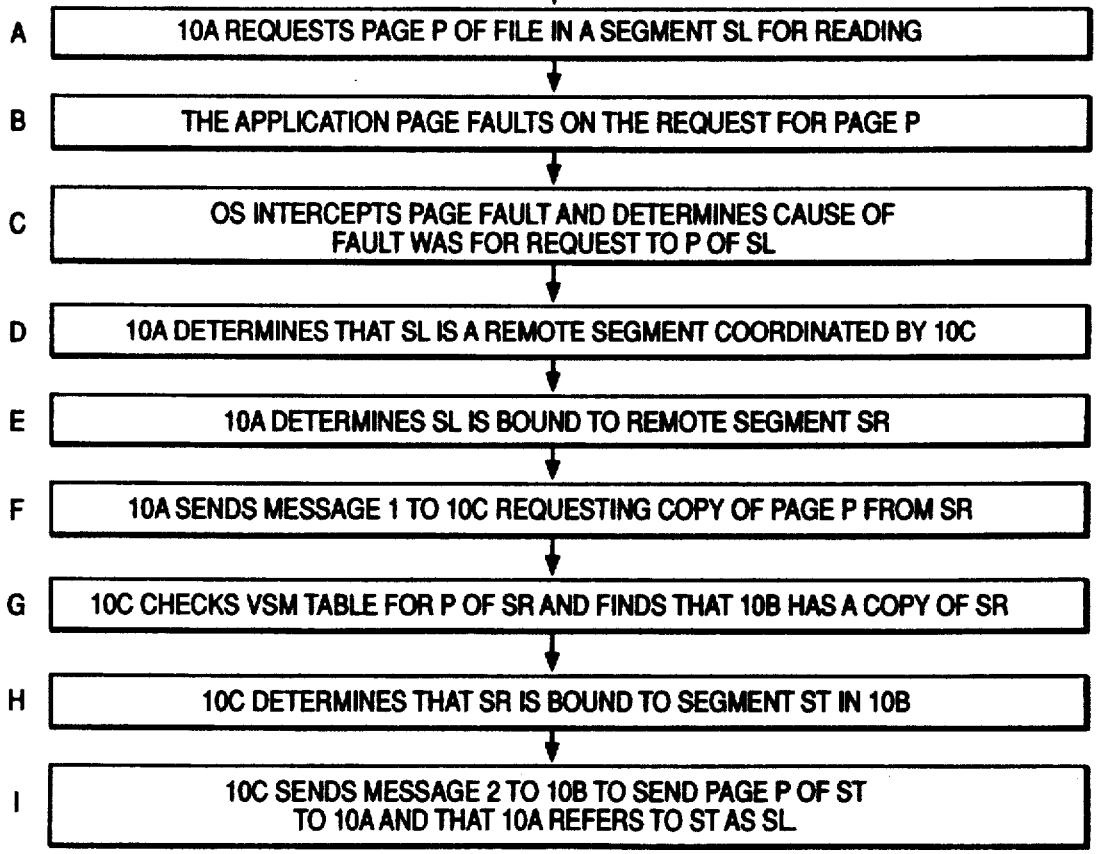
FIG. 14 is a flow chart illustrating the steps performed by the access coordinator when a using processing unit wishes to page-in a copy of a page that is not in the memory of any of the processing units in the configuration.

FIG. 14 is a flow chart illustrating the steps performed by the access coordinator when a using processing unit wishes to page-in a copy of a page that is not in the memory of any of the processing units in the configuration. This description assumes for the purpose of discussion that:

(1) an application program executing on processing unit 10a has previously opened the file and had the file mapped into the application program's virtual address space; and (2) that processing unit 10c serves as the access coordinator for the file.

In Step A of FIG. 14 an application program executing on processing unit 10a attempts to access for reading page P of segment SL containing file F.

In Step B the application program page faults.

In Step C the operating system executing on processing unit 10a intercepts the page fault and determines that it was caused by a read access to page P of segment SL by the application program.

In Step D processing unit 10a determines that segment SL is a remote segment whose access is coordinated by processing unit 10c.

In Step E processing unit 10a determines that segment SL is bound to remote segment SR.

In Step F processing unit 10a sends message 1 to processing unit 10c requesting that processing unit 10c send a copy of page P of segment SR to processing unit 10a.

In Step G, upon receipt of message 1, processing unit 10c examines its VSM Table looking for entries for page P of segment SR. Assume for the sake of discussion that exactly one entry exists in the VSM Table for page P of Segment SR, and that the entry indicates that processing unit 10b has a copy of the page in its memory, and that the ReadOnly consistency state is associated with that copy of the page.

In Step H processing unit 10c determines that segment SR is bound to segment ST in processing unit 10b.

In Step I processing unit 10c sends message 2 to processing unit 10b requesting that processing unit 10b send a copy of page P of segment ST to processing unit 10a and that the copy of the page have the ReadOnly consistency state associated with it. Message 2 further indicates that processing unit 10a refers to segment ST as segment SL.

Figure 15A:
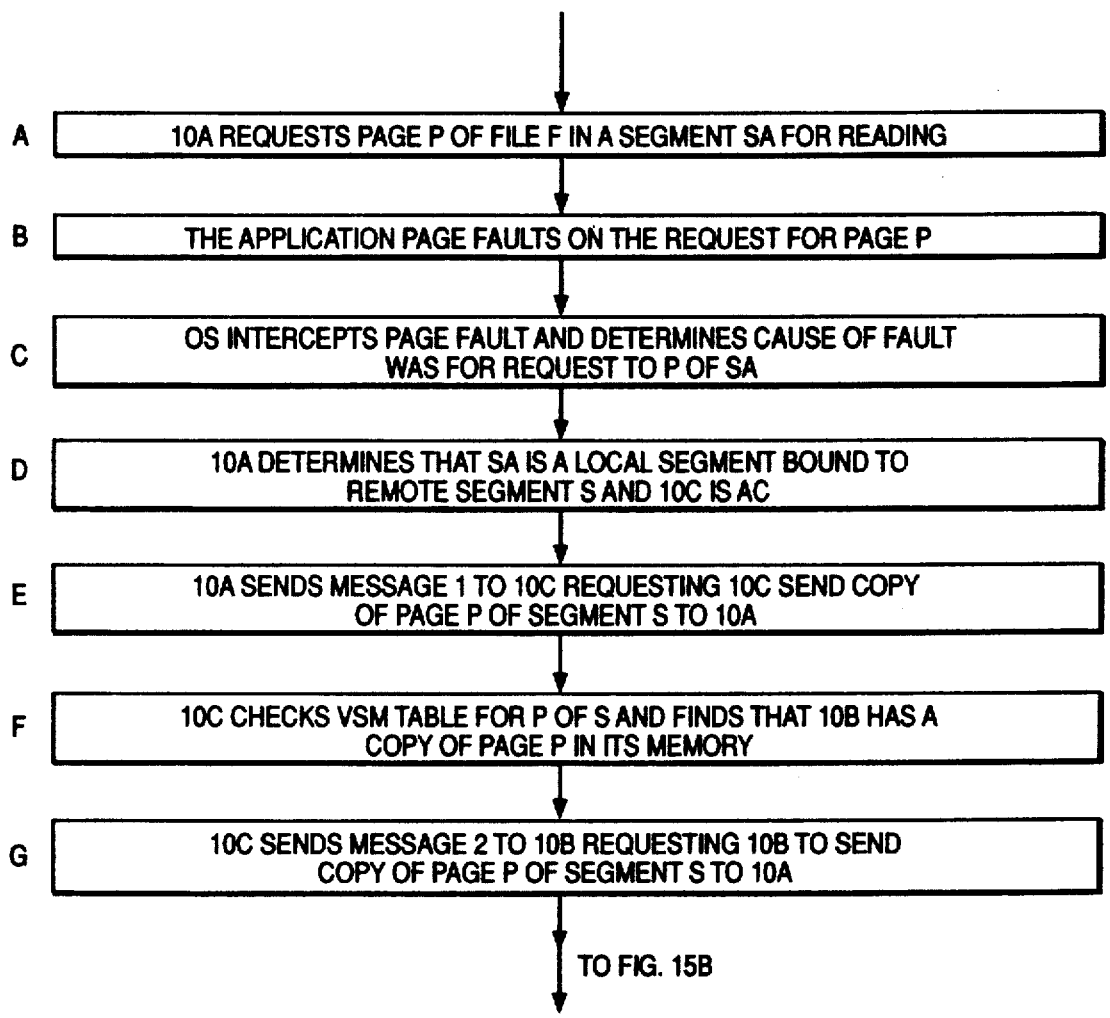
FIG. 15a and 15b is a flow chart illustrating the detailed steps of how the VSMT is updated by the access coordinator when a page of data is transferred from one processing unit to another processing unit.
Figure 15B:
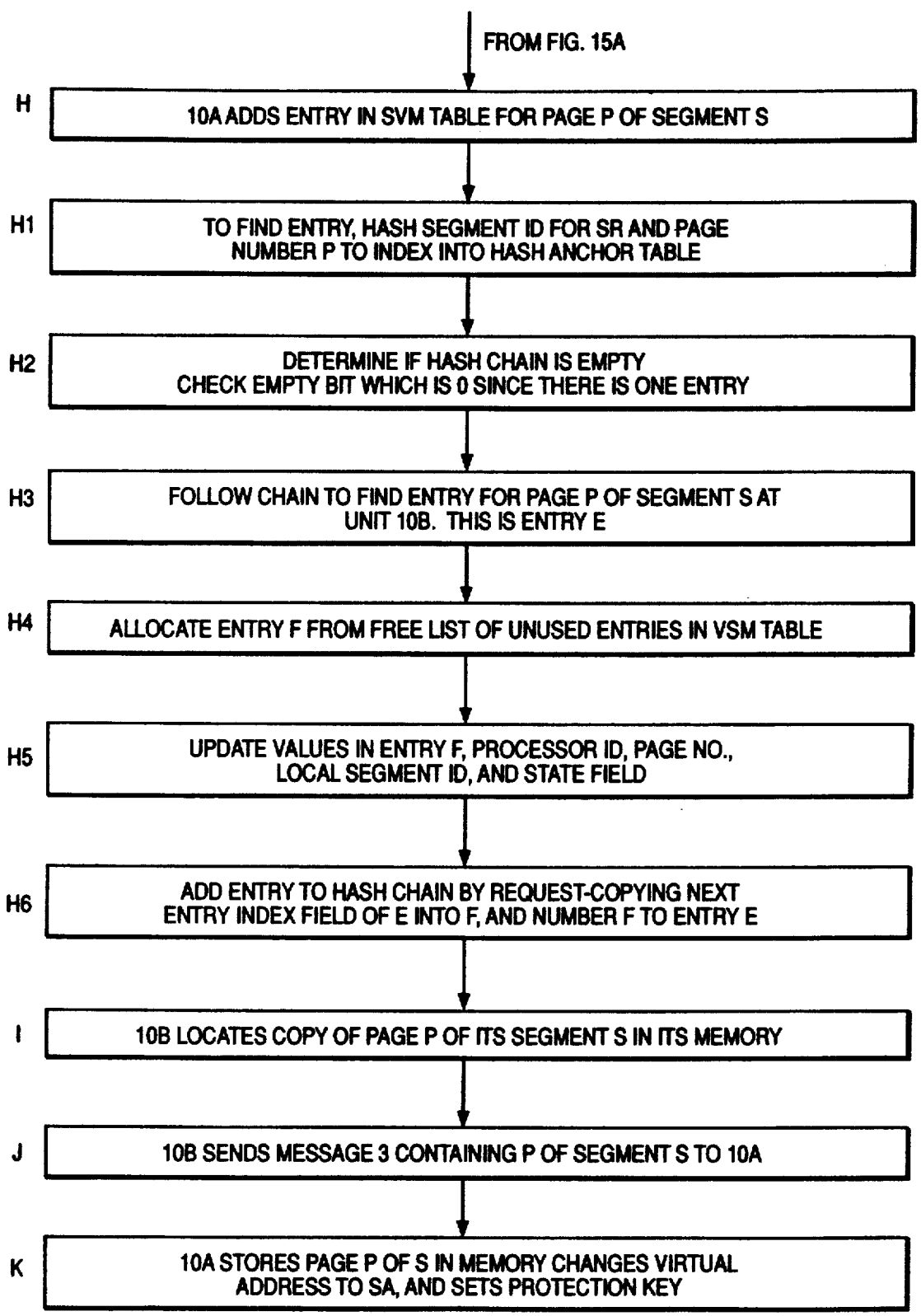

FIGS. 15a and 15b is a flow chart illustrating the detailed steps of how the VSMT is updated by the access coordinator when a page of data is transferred from one processing unit to another processing unit. This description assumes for the purpose of discussion that: (1) an application program executing on processing unit 10a has previously opened the file and had the file mapped into the application programs' virtual address space; and (2) that processing unit 10c serves as the access coordinator for the file.

In Step A of FIG. 15A an application program executing on processing unit 10a attempts to access for reading page P of segment SA containing the file F.

In Step B the application program page faults.

In Step C the operating system executing on processing unit 10a intercepts the page fault and determines that it was caused by a read access to page P of segment SA by the application program.

In Step D processing unit 10a determines that segment SA is a local segment bound to remote segment S whose access is coordinated by processing unit 10c.

In Step E processing unit 10a sends message 1 to processing unit 10c requesting that processing unit 10c send a copy of page P of segment S to processing unit 10a.

In Step F, upon receipt of message 1, processing unit 10c examines its VSM Table looking for entries for page P of segment S. We shall assume for the purpose of discussion that: (1) exactly one Lentry exists in the VSM Table for page P of Segment S; (2) the entry indicates that processing unit 10b has a copy of the page in its memory; (3) the ReadOnly consistency state is associated with that copy of the page.

In Step G processing unit 10c sends message 2 to processing unit 10b requesting that processing unit 10b send a copy of page P of segment S to processing unit 10a and that the copy of the page have the ReadOnly consistency state associated with it.

In Step H processing unit 10c adds an entry to its VSM Table indicating that processing unit 10a has been sent a copy of page P of segment S with the ReadOnly consistency state associated with it. In order to add an entry to the VSM Table for page P of segment S, the following steps must be performed by processing unit 10c:

(H1) Hash the segment identifier SR and the page number P together to locate the hash anchor table entry that would correspond to page P of segment SR if there were already an entry for this page in the VSM Table.

(H2) Determine whether the hash chain is empty. Perform this operation by examining the Empty bit in the hash anchor table entry for the computed hash value. In the case at hand the hash chain contains at least one entry, which is the entry for page P of segment S located at processing unit 10b; thus, the Empty bit will be clear.

(H3) Follows the hash chain for the computed hash value until it finds the entry for page P of segment S at processing unit 10b. We shall refer to this below as entry E of the VSM Table.

(H4) Allocate an entry F in the VSM Table by taking an entry off the free-list of currently unused VSM Table entries. Allocating an entry in a data structure from a free list is well known, simple, and will be understood by a person skilled in the art of computer programming; therefore, it is not illustrated here.

(H5) Fill the appropriate values into entry F. Specifically, fill in: (a) the Processor Identifier field with an integer that uniquely identifies processing unit 10a;

(b) the Page Number field with the page number P;

(c) the Local Segment Identifier field with the segment identifier S; and (d) the State field with an integer that uniquely identifies consistency state ReadOnly.

(H6) Add entry F to the hash chain for the computed hash value. Perform this operation by:

(a) copying the Next Entry Index field of entry E into the Next Entry Index field of entry F; then (b) copying the number F into the Next Entry Index field of entry E. After Step H6 has been completed, entry F is on the hash chain for the computed hash value.

In Step I, upon receipt of message 2 from processing unit 10c, processing unit 10b locates page P of segment S in its main memory.

In Step J processing unit 10b sends message 3 containing page P of segment S to processing unit 10a. Message 3 indicates that page P of segment S has the ReadOnly consistency state associated with it.

In Step K, upon receipt of message 3 from processing unit 10b, processing unit 10a places the copy of page P of segment S in its main memory, changes the virtual address of page P of segment S to indicate that the page is page P of segment SA, then sets the effective protection key for the page to ReadOnly.

Figure 16:
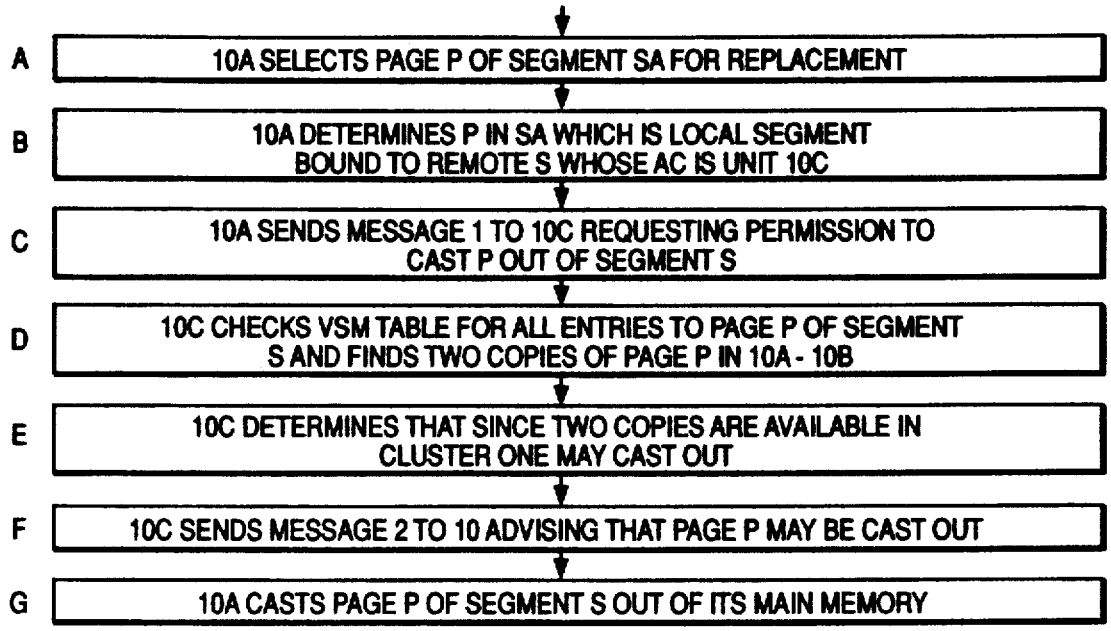
FIG. 16 is a flow chart illustrating the steps performed by the access coordinator when a using processing unit sends a request to cast a page out of its main memory and there is a copy of the page in the memory of another processing unit.

FIG. 16 is a flow chart illustrating the steps performed by the access coordinator when a using processing unit sends a request to cast-out a page from its main memory.

In Step A of FIG. 16 processing unit 10a selects page P of segment SA for replacement. This would happen in the normal course of events if, for example, the virtual memory manager (VMM) component of the operating system executing on processing unit 10a determined that page P of segment SA had not been accessed by any application program for an extended period of time.

In Step B, processing unit 10a determines that page P is contained within segment SA, and that segment SA is a local segment bound to remote segment S whose access is coordinated by processing unit 10c.

In Step C processing unit 10a sends message 1 to processing unit 10c requesting that processing unit 10a be allowed to cast page P of segment S out of its main memory.

In Step D, upon receipt of message 1 from processing unit 10a, processing unit 10c examines its VSM Table for all entries corresponding to page P of segment S. We shall assume for the purpose of discussion that: (1) exactly two entries exist in its VSM Table for page P of segment S; (2) the former entry indicates that processing unit 10a has a copy of page P of segment S in its memory in ReadOnly consistency state; and (3) the latter entry indicates that processing unit 10b also has a copy of page P of segment S in its memory, and that this copy is also in ReadOnly consistency state.

In Step E processing unit 10c determines that, since: (1) there are currently two copies of the page cached in the main memory of processing units within the cluster configuration; and (2) both copies of the page are in ReadOnly consistency state, then processing unit 10a may be allowed to cast page P of segment S out of its main memory without the significant degradation of performance that re-reading page P of segment S from secondary storage might later incur.

In Step F processing unit 10c sends message 2 to processing unit 10a responding that processing unit 10a may cast page P of segment S out of its main memory.

In Step G, upon receipt of message 2 from processing unit 10c, processing unit 10a casts page P of segment S out of its main memory.

Figure 17:
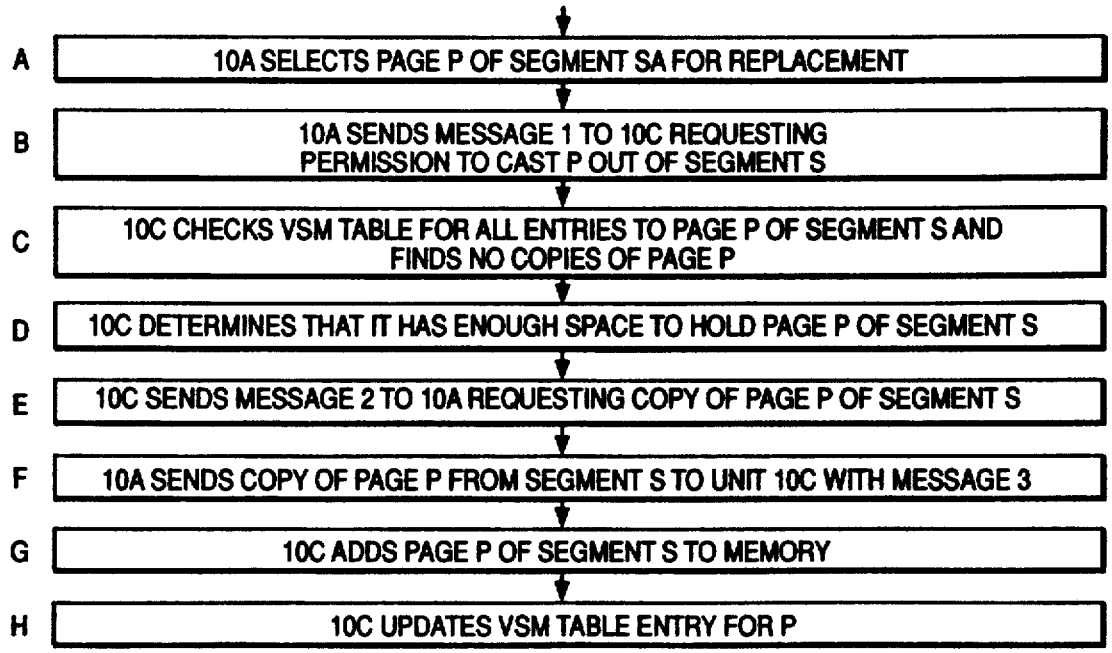
FIG. 17 is a flow chart illustrating the steps performed by the access coordinator when a using processing unit sends a request to cast a page out of its main memory and there isn't a copy of the page in the memory of any other processing unit.

FIG. 17 is a flow chart illustrating the steps performed by the access coordinator when a using processing unit sends a request to cast a page out of its main memory and there isn't a copy of the page in the memory of any other processing unit.

In Step A of FIG. 17 the VMM component of the operating system executing at processing unit 10a selects page P of segment SA as a candidate for replacement.

In Step B processing unit 10a sends message 1 to processing unit 10c requesting that processing unit 10a be allowed to cast page P of segment S out of its main memory.

In Step C, upon receipt of message 1 processing unit 10c examines its VSM Table for entries for page P of segment S. We shall assume for the purpose of discussion that no entry exist in its VSM Table for page P of segment S.

In Step D processing unit 10c determines that it has enough space in its main memory to hold page P of Segment S and allocates a trame for that purpose.

In Step E processing unit 10c sends message 2 to processing unit 10a requesting that processing unit 10a send a copy of page P of to processing unit 10c.

In Step F, upon receipt of message 2 from processing unit 10c, processing unit 10a sends message 3 containing page P of segment S to processing unit 10c.

In Step G, upon receipt of message 3 from processing unit 10, processing unit 10c adds page P of segment S to its main memory.

In Step H processing unit 10c updates its VSM Table indicating that a copy of page P with the ReadOnly consistency state associated with it, has been moved from processing unit 10a's main memory to processing unit 10c's main memory. In order to update an entry in the VSM Table for page P of segments the following steps must be performed by processing unit 10c.

(H1) Hash the segment identifier S and the page number P together to locate the hash anchor table entry that would correspond to page P of segment S if there were already an entry for this page in the VSM Table.

(H2) Determine whether the hash chain is empty. Perform this operation by examining the Empty bit in the hash anchor table entry for the computed hash value. In the case at hand the hash chain contains at least one entry, which is the entry for page P of segment S located at processing unit 10b; thus, the Empty bit will be clear.

(H3) Follow the hash chain for the computed hash value until it finds the entry for page P of segment S at processing unit 10a.

(H4) Update the processor Identifier field of entry E with an integer that uniquely identifies processing unit 10c after Step 4 has been completed Entry E has been updated.

Figure 18:
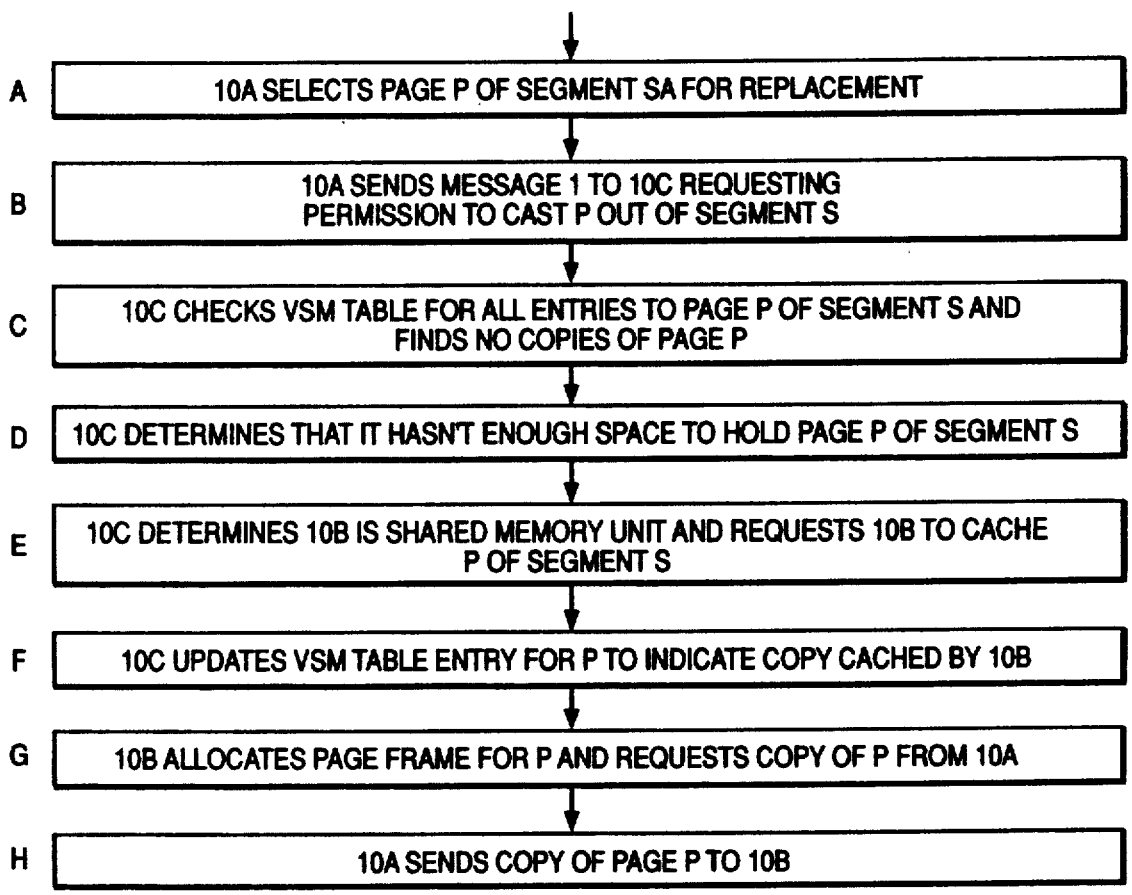
FIG. 18 is a flow chart illustrating the steps performed by the access coordinator when it determines that a given page of data must be cached by a shared memory processing unit.

FIG. 18 is a flow chart illustrating the steps performed by the access coordinator when it determines that a given page of data must be cached by a shared memory processing unit.

In Step A of FIG. 18 the VMM component of the operating system executing at processing unit 10a selects page P of segment S as a candidate for replacement.

In Step B processing unit 10a sends message 1 to processing unit 10c, the access coordinator for segment S, requesting that processing unit 10a be allowed to cast page P of segment S out of its main memory.

in Step C, upon receipt of message 1 processing unit 10c examines its VSM Table for entries for page P of segments S. Assume for the purpose of discussion hat no entry exist in its VSM Table for page P of segment S.

In Step D processing unit 10c determines that it does not have enough space in its main memory to cache page P of Segment S.

In Step E processing unit 10c determines that processing unit 10b is acting as a shared memory unit for the cluster configuration and sends message 2 to processing unit 10b requesting that processing unit 10b cache a copy of page P of segment S in its main memory processing unit 10c.

In Step F processing unit 10c adds an entry to its VSM Table indicating processing unit 10b now holds a copy of page P of segment S with the ReadOnly consistency state associated with it. In order to add an entry in the VSM Table for page P of segment S the following steps must be performed by processing unit 10c.

(F1) Hash the segment identifier S and the page number P together to locate the hash anchor table entry that would correspond to page P of segment S if there were already an entry for this page in the VSM Table.

(F2) Determine whether the hash chain is empty. Perform this operation by examining the Empty bit in the hash anchor table entry for the computed hash value. In the case at hand the hash chain contains at least one entry, which is the entry for page P of segment S located at processing unit 10b; thus, the Empty bit will be clear.

(F3) Follow the hash chain for the computed hash value until it finds the entry for page P of segment S at processing unit 10a.

(F4) Update the processor Identifier field of entry E with an integer that uniquely identifies processing unit 10b. After Step 4 has been completed entry E has been updated.

(G) In Step G upon receipt of message 2 from processing unit 10c, processing unit 10b allocates a page frame on its main memory and sends message 3 to processing unit 10a requesting that processing unit 10a send page P of Segment S to processing unit 10b'.

(H) In Step H upon receipt of message 3 from processing unit 10c, processing unit 10 a sends page P of Segment S along with the ReadOnly consistency state associated with that page to processing unit 10b.

While the preferred embodiment of applicant's method has been described for use in a virtual memory environment, it will be apparent that the method is equally applicable to a cluster configuration comprising a plurality of processing units which do not employ a virtual type of memory. The underlying problem of I/O disk access for obtaining a copy of data that is currently in the main memory of another unit can be solved in the manner taught in this application, namely maintaining information on what data has been sent to the main memory by what processor unit and transferring a copy of that data to the requestor from main memory having the copy rather than performing an I/O operation to disk to obtain the data.

It will be apparent to those persons skilled in the art that other modifications may be made in the preferred embodiment of the method without departing from the spirit of the invention, the scope and appended claims.

We claim:

1. A method to minimize I/O access operations in a data processing system having
   A) a plurality of processor units comprising a first processor unit with a first main memory, first operating systems, and first secondary storage device; a second processor unit with a second main memory and second operating system; and a third processor unit with a third main memory and third operating system; and
   B) a switch for selectively interconnecting any pair of said units in a data transferring relationship to permit data that is stored in said first memory to be transferred to said third main memory in response to request from said third unit to said first unit, said method comprising the following steps in combination;
   A) maintaining by each said first, second and third operating system,
      (a) a list of each of the files stored in said data processing system, and
      (b) an indication of which of said processor units is the access coordinator for said each of said files,
   B) opening one of said files, stored at said first processor unit as identified by said indication in response to a request to said first processor unit for specified information from said second said processor unit,
   C) transferring from said first secondary storage device of said first processor unit to said first main memory and thereafter transferring from said first main memory to said second main memory said specified information from said one of said files in response to said request by said second processor unit, and discarding said specified information from said first main memory, and
   D) thereafter transferring said specified information from said second main memory to said third main memory in response to a request from said first operating system to said second operating system, that was prompted by a request to said first operating system from said third operating system for said specified information.

2. The method set forth in claim 1 in which said step of maintaining by each said first, second and third operating system further comprises the step of
   (a) maintaining by said each first, second, and third operating system a corresponding Virtual Shared Memory (VSM) Table one said VSM Table identifying which of said processor units has a copy of said specified information that is being coordinated by said access coordinator.

3. The method set forth in claim 2 in which said step of transferring from said first main memory to said second main memory further comprises the step of
   (a) updating said VSM Table of said first operating system to reflect that said specified information is stored in said second main memory.

4. The method set forth in claim 3 in which said step of transferring said specified information from said second main memory to said third main memory included the further step of
   (a) updating sad VSM Table of said first processor unit to indicate that a copy of said specified information is stored in said third main memory.

5. A method in a data processing system having
   a first processor unit with a first main memory, first operating system, and first secondary storage device; a second processor unit with a second main memory and second operating system; and a third processor unit with a third main memory and third operating system, said first, second, and third processing units being interconnected by a communication link, said method comprising the following steps;
   A) maintaining by each said first, second, and third operating system indications of which of said processor units coordinates access for a file in the data processing system;
   B) maintaining by said first operating system information which indicates that a copy of said file is currently maintained in said second main memory and is not currently maintained in said first main memory, and
   C) servicing a request by said third processor unit to said first processor unit for a copy of said file, said request being directed to said first processor unit by one of said indications indicating at said third processor unit that said first processor unit coordinates access to the identified data, said servicing causing said second processor unit to transfer a copy of said file to said third main memory, rather than said first unit servicing said request by an I/O operation to said first secondary storage device if said file is not in said first main memory.

6. The method recited in claim 5 in which said system further includes a second and third secondary storage device for said second and third processor unit respectively, and wherein
   (a) said first, second, and third main memory and said respective first, second, and third secondary storage device of each said respective first, second, and third processor unit comprise a virtual memory for said respective first, second, and third processor unit, each said virtual memory having the same virtual address range, that includes a plurality of contiguous segments, each of which includes a plurality of virtual page addresses,
   (b) said first, second, and third secondary storage device comprises, respectively, a plurality of block addressable storage locations each of which stores a page of data,
   (c) said first, second, and third main memory comprises, respectively, a plurality of page frames for storing a page of data,
   (d) each of said first, second, and third processor units having the same operating system including a memory manager having a page fault handling mechanism for resolving page faults that occur in response to requests from an application program to process a page of data that is not in main memory, and
   (e) a switch is activated by said first, second and third processing units for selectively interconnecting any two of said first, second, and third processor units, said method including the further steps of
   storing in each said respective virtual memory a copy of said same operating system and further storing at least one application program in a corresponding said virtual memory of at least one of said first, second, and third processor units, and
   coordinating access requests to said at least one application program from other of said first, second, and third processor units by one of said first, second, an third processor units controlling one of said segments of said corresponding said virtual memory where said at least one application program is stored.

7. The method recite in claim 6 in which said step of maintaining information by said first operating system includes the further steps of
   (a) establishing a first data structure having a plurality of entries for storing a unique identifier for each said at least one application program stored in said system, and a processor unit ID to designate an Accessor Coordinator (AC) for each said stored at least one application program, and
   (b) storing said first data structure in said first, second, and third main memory.

8. The method recited in claim 7 in which said step of maintaining information by said first operating system includes the further steps of
   (a) establishing a second data structure having a plurality of entries, each of which stores an indication of the virtual address of a page of data transferred from a file being coordinated by said first processor unit, and the identity of a remaining said second or third processor unit that has a copy of said transferred page.
   (b) storing said second data structure in said first, second and third main memory, and
   (c) updating said first and second data structures as pages of data are transferred between said first, second, and third processing unit during said step of servicing.

9. The method recited in claim 8 including the further step of
   (a) resolving local page faults in one of said first, second, and third processor units with said memory manager by first determining from said second data structure whether a copy of the page which caused the local fault is stored in a corresponding first, second or third main memory of another of said first, second or third processor units before resoling said fault with said page fault handling mechanism of said first, second, or third one of said processor units.

* * * * *